(12) United States Patent
Su et al.

(10) Patent No.: US 12,405,439 B2
(45) Date of Patent: Sep. 2, 2025

(54) IMAGING LENS DRIVING MODULE AND ELECTRONIC DEVICE

(71) Applicant: LARGAN DIGITAL CO., LTD., Taichung (TW)

(72) Inventors: Heng-Yi Su, Taichung (TW); Ming-Ta Chou, Taichung (TW); Chen-Yi Huang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 920 days.

(21) Appl. No.: 17/338,751

(22) Filed: Jun. 4, 2021

(65) Prior Publication Data

US 2022/0137323 A1 May 5, 2022

(30) Foreign Application Priority Data

Oct. 29, 2020 (TW) ................................. 109137719

(51) Int. Cl.
*G02B 7/08* (2021.01)
*G02B 7/02* (2021.01)
*H01F 5/04* (2006.01)
*H04N 23/51* (2023.01)
*H04N 23/55* (2023.01)

(52) U.S. Cl.
CPC ............... *G02B 7/08* (2013.01); *G02B 7/026* (2013.01); *H01F 5/04* (2013.01); *H04N 23/51* (2023.01); *H04N 23/55* (2023.01)

(58) Field of Classification Search
CPC .......... G02B 27/646; G02B 7/08; G02B 7/09; G02B 7/04; G02B 27/648; H04N 23/55; H04N 23/57; H04N 23/54; H04N 23/687; H04N 23/51
See application file for complete search history.

(56) References Cited

U.S. PATENT DOCUMENTS

| 7,724,449 | B2 | 5/2010 | Takei et al. |
| 7,852,579 | B2 | 12/2010 | Osaka et al. |
| 8,116,012 | B2 | 2/2012 | Higuchi |
| 8,605,366 | B2 | 12/2013 | Kamatani et al. |

(Continued)

FOREIGN PATENT DOCUMENTS

| CN | 207096656 U | 3/2018 |
| WO | 2016070361 A1 | 5/2016 |
| WO | 2020122126 A1 | 6/2020 |

*Primary Examiner* — Ephrem Z Mebrahtu
(74) *Attorney, Agent, or Firm* — McClure, Qualey & Rodack, LLP

(57) ABSTRACT

An imaging lens driving module includes an imaging lens set, a carrier element and a driving mechanism. The imaging lens set has an optical axis. The carrier element is configured to dispose the imaging lens set, and includes an assembling structure. The assembling structure is disposed on an outer surface of the carrier element, and extends along a direction away from the optical axis. The driving mechanism is configured to drive the carrier element to move, and includes at least one coil pair and at least two magnets. The coil pair is disposed on the assembling structure, and includes a bottom layer coil and a top layer coil. The bottom layer coil is wound around and directly contacted with the assembling structure. The top layer coil is stacked on and wound around the bottom layer coil. The magnets correspond to the coil pair, respectively.

5 Claims, 34 Drawing Sheets

(56) References Cited

U.S. PATENT DOCUMENTS

| | | | |
|---|---|---|---|
| 8,638,510 B2 | 1/2014 | Lee | |
| 9,256,049 B2 | 2/2016 | Park | |
| 9,423,589 B2 | 8/2016 | Nakagawa | |
| 10,057,474 B2 | 8/2018 | Minamisawa | |
| 10,185,115 B2 | 1/2019 | Wang et al. | |
| 10,304,605 B2 | 5/2019 | Yanagisawa | |
| 10,451,836 B2 | 10/2019 | Cho et al. | |
| 2020/0393642 A1* | 12/2020 | Hu | G02B 7/08 |
| 2021/0294070 A1* | 9/2021 | Tanaka | G03B 13/36 |
| 2022/0255414 A1* | 8/2022 | Kim | H04N 23/57 |

* cited by examiner

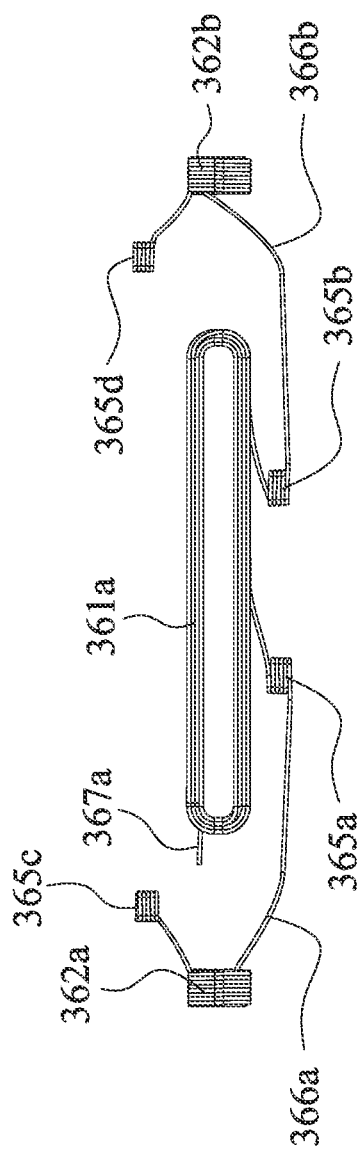
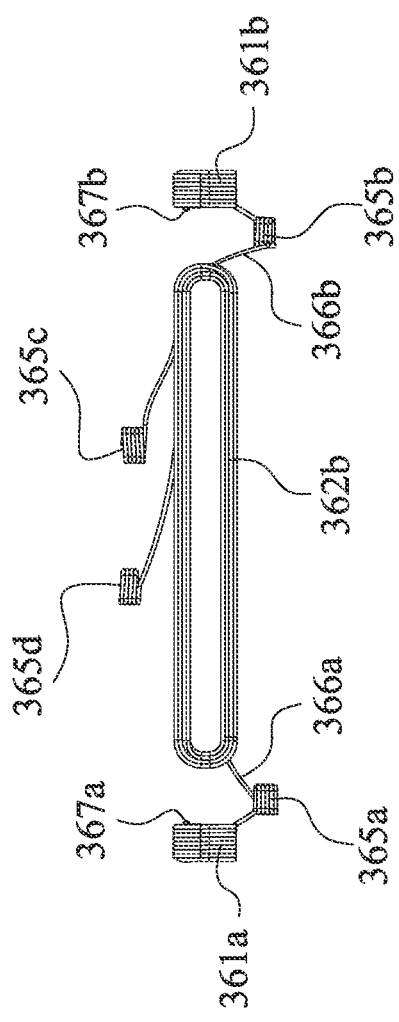
Fig. 3G
Fig. 3H

IMAGING LENS DRIVING MODULE AND ELECTRONIC DEVICE

RELATED APPLICATIONS

This application claims priority to Taiwan Application Serial Number 109137719, filed Oct. 29, 2020, which is herein incorporated by reference.

BACKGROUND

Technical Field

The present disclosure relates to an imaging lens driving module. More particularly, the present disclosure relates to an imaging lens driving module applicable to portable electronic devices.

Description of Related Art

In recent years, portable electronic devices have developed rapidly. For example, intelligent electronic devices and tablets have been filled in the lives of modern people, and imaging lens driving modules mounted on portable electronic devices have also prospered. However, as technology advances, the quality requirements of the imaging lens driving modules are becoming higher and higher. Therefore, an imaging lens driving module, which the manufacturing efficiency can be promoted, needs to be developed.

SUMMARY

According to one aspect of the present disclosure, an imaging lens driving module includes an imaging lens set, a carrier element and a driving mechanism. The imaging lens set has an optical axis. The carrier element is configured to dispose the imaging lens set, and includes an assembling structure. The assembling structure is disposed on an outer surface of the carrier element, and extends along a direction away from the optical axis. The driving mechanism is configured to drive the carrier element to move along a direction parallel to the optical axis, and includes at least one coil pair, at least two magnets and at least one elastic element. The coil pair is disposed on the assembling structure of the carrier element, and includes a bottom layer coil and a top layer coil. The bottom layer coil is wound around and directly contacted with the assembling structure. The top layer coil is stacked on and wound around the bottom layer coil, the top layer coil is farther away from the assembling structure than the bottom layer coil away from the assembling structure, and the top layer coil overlaps the bottom layer coil along the direction parallel to the optical axis. The magnets correspond to the coil pair, respectively. The elastic element is coupled with the carrier element. The coil pair only has two wire terminals, and the wire terminals are disposed on the top layer coil, respectively. The wire terminals of the top layer coil are electrically connected to the elastic element of the driving mechanism.

According to one aspect of the present disclosure, an electronic device includes the imaging lens driving module of the aforementioned aspect.

According to one aspect of the present disclosure, an imaging lens driving module includes an imaging lens set, a carrier element and a driving mechanism. The imaging lens set has an optical axis. The carrier element is configured to dispose the imaging lens set, and includes an assembling structure. The assembling structure is disposed on an outer surface of the carrier element, and extends along a direction away from the optical axis. The driving mechanism is configured to drive the carrier element to move along a direction parallel to the optical axis, and includes at least one coil pair and at least two magnets. The coil pair is disposed on the assembling structure of the carrier element, and includes a bottom layer coil and a top layer coil. The bottom layer coil is wound around and directly contacted with the assembling structure. The top layer coil is stacked on and wound around the bottom layer coil, the top layer coil is farther away from the assembling structure than the bottom layer coil away from the assembling structure, and the top layer coil overlaps the bottom layer coil along the direction parallel to the optical axis. The magnets correspond to the coil pair, respectively. The bottom layer coil of the coil pair only has two wire ends. The coil pair further includes a connecting wire connected to the wire ends of the bottom layer coil so as to keep the bottom layer coil electrically connected.

According to one aspect of the present disclosure, an imaging lens driving module includes an imaging lens set, a carrier element and a driving mechanism. The imaging lens set has an optical axis. The carrier element is configured to dispose the imaging lens set, and includes an assembling structure. The assembling structure is disposed on an outer surface of the carrier element, and extends along a direction away from the optical axis. The driving mechanism is configured to drive the carrier element to move along a direction parallel to the optical axis, and includes at least one coil pair, at least two magnets and at least one elastic element. The coil pair is disposed on the assembling structure of the carrier element, and includes a first coil and a second coil. The first coil is disposed on the assembling structure of the carrier element. The second coil is disposed on the assembling structure of the carrier element, the second coil corresponds to the first coil, and each of the first coil and the second coil includes a bottom layer coil and a top layer coil. The bottom layer coil is wound around and directly contacted with the assembling structure. The top layer coil is stacked on and wound around the bottom layer coil, the top layer coil is farther away from the assembling structure than the bottom layer coil away from the assembling structure, and the top layer coil overlaps the bottom layer coil along the direction parallel to the optical axis. The magnets correspond to the coil pair, respectively. The elastic element is coupled with the carrier element. A coiling direction of the first coil and a coiling direction of the second coil are the same during observing from the first coil towards the second coil.

BRIEF DESCRIPTION OF THE DRAWINGS

FIG. 3G is a side schematic view of the coil pairs according to the 3rd example in FIG. 3A.

FIG. 3H is another side schematic view of the coil pairs according to the 3rd example in FIG. 3A.

DETAILED DESCRIPTION

Figure 1A:
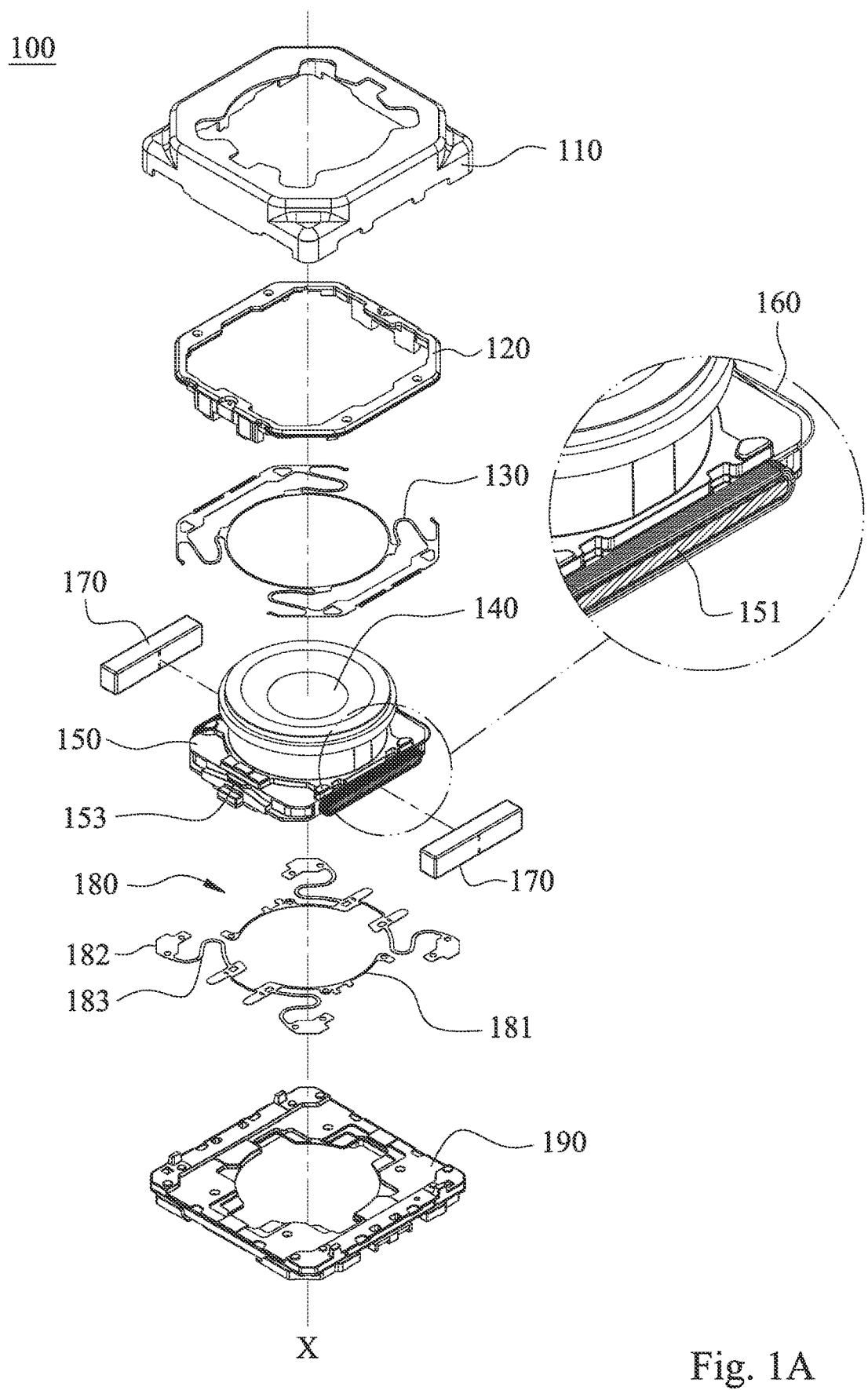
FIG. 1A is an exploded schematic view of an imaging lens driving module according to the 1st example of the present disclosure.

The present disclosure provides an imaging lens driving module, and the imaging lens driving module includes an imaging lens set, a carrier element and a driving mechanism. The imaging lens set has an optical axis. The carrier element is configured to dispose the imaging lens set, and includes an assembling structure, wherein the assembling structure is disposed on an outer surface of the carrier element, and extends along a direction away from the optical axis. The driving mechanism is configured to drive the carrier element to move along a direction parallel to the optical axis, and includes at least one coil pair and at least two magnets. The coil pair is disposed on the assembling structure of the carrier element, and includes a bottom layer coil and a top layer coil, wherein the bottom layer coil is wound around and directly contacted with the assembling structure; the top layer coil is stacked on and wound around the bottom layer coil, the top layer coil is farther away from the assembling structure than the bottom layer coil away from the assembling structure, and the top layer coil overlaps the bottom layer coil along the direction parallel to the optical axis. The magnets correspond to the coil pair, respectively. In particular, according to the present disclosure, the same wire is wound around the assembling structure along the same coiling direction, and the coil pair, which is relatively disposed, is formed. In the conventional art, a coil pair is not formed by simultaneously winding around an assembling structure. Hence, the cycle time of the product can be reduced by the imaging lens driving module of the present disclosure relative to the coil pair of the conventional art.

In detail, the carrier element can be a coil holder, a lens carrier or elements which are combined with the aforementioned functions, but the present disclosure is not limited thereto. Further, a driving magnetic force can be generated by the interaction between the magnets and the coil pair, and the carrier element can be driven to move along the direction parallel to the optical axis by the driving mechanism.

The driving mechanism can further include at least one elastic element coupled with the carrier element. Furthermore, a number of the elastic element can be two, and the elastic elements can include an upper elastic element and a lower elastic element. The upper elastic element is disposed on an object side of the imaging lens set, the lower elastic element is disposed on an image side of the imaging lens set, and the lower elastic element corresponds to the upper elastic element. Therefore, the driving range of the driving mechanism can be defined.

The coil pair can only have two wire terminals, and the wire terminals are disposed on the top layer coil, respectively. In particular, the wire terminals can be a wire wound around an end area of the carrier element, and the wire terminals can be disconnected. Further, an end of the wire terminals is connected to the top layer coil, and another end of the wire terminals is exposed in the air.

The wire terminals of the top layer coil can be electrically connected to the elastic element of the driving mechanism, wherein the wire terminals of the top layer coil can be electrically connected to the elastic element of the driving mechanism by welding or dispensing, but the present disclosure is not limited thereto. Therefore, the wire terminals can be electrically connected to other elements so as to promote the design margin of the product station. In particular, the performing sequence can be adjusted relatively to other stations while the planning and design stage of the welding station or the dispensing station.

The coil pair of the driving mechanism can be the wire composed by simultaneously winding around the assembling structure of the carrier element from the bottom layer coil towards the wire terminals of the top layer coil. In detail, the bottom layer coil is composed of the wire, and the top layer coil has the wire terminals, hence, the coil pair is composed of the same wire. Forming the coil pair by the same wire simultaneously winding around is favorable for reducing the manufacturing process and lowering the cycle time of the product.

The carrier element can further include at least two columnar structures, wherein the columnar structures are disposed on the outer surface of the carrier element, and extend along the direction parallel to the optical axis and a direction towards an image side of the imaging lens set. In particular, the columnar structures and the carrier element can be integrally formed, but the present disclosure is not limited thereto. The assembling tolerance between the elements can be reduced by the integral formation of the columnar structures and the carrier element.

Each of the wire terminals of the top layer coil can be wound around and directly contacted with each of the columnar structures. In detail, the required tension of the wire for fixing the coil pair is provided by the wire terminals wound around the columnar structures. Therefore, the wire can be prevented from loosing from the carrier element to promote the yield rate.

The lower elastic element can include an inner-side portion, an outer-side portion and an elastic connecting portion, wherein the inner-side portion is coupled with the carrier element, the outer-side portion is coupled with a base of the imaging lens driving module, and the elastic connecting portion is connected to the inner-side portion and the outer-side portion. Therefore, the lower elastic element can have the better coupled location to ensure the driving efficiency of the driving mechanism.

The wire terminals of the top layer coil can be electrically connected to the lower elastic element except the outer-side portion. Therefore, the better location of the electrical connection can be obtained, and the aforementioned disposition is favorable for the compact size of the imaging lens driving module.

The carrier element can further include at least one abutting portion, wherein the abutting portion and the assembling structure are alternately disposed along a circumferential direction around the optical axis. Therefore, the space utilization in the imaging lens driving module can be enhanced.

The connecting wire of the coil pair can be directly contacted with a separation point of the abutting portion of the carrier element. By the separation point, the process of the automatic optical inspection can be more precise and faster, and the wire length of the coil pair can be effectively controlled to lower the manufacturing cost.

Or, the bottom layer coil of the coil pair can only have two wire ends, wherein the coil pair can further include a connecting wire connected to the wire ends of the bottom layer coil so as to keep the bottom layer coil electrically connected. In detail, the connecting wire can be a portion of the coil pair, but the present disclosure is not limited thereto. Therefore, the feasibility of the coil pair composed of the wire which is continuous can be provided.

The coil pair can further include a first coil and a second coil, wherein the first coil is disposed on the assembling structure of the carrier element, the second coil is disposed on the assembling structure of the carrier element, and the second coil corresponds to the first coil. Moreover, each of the first coil and the second coil can include the bottom layer coil and the top layer coil, and a coiling direction of the first coil and a coiling direction of the second coil are the same during observing from the first coil towards the second coil, that is, both of the coiling direction of the first coil and the coiling direction of the second coil are clockwise or counterclockwise. By the same coiling direction, the coiling process can be simplified to further reduce the time cost.

The first coil and the second coil can be composed of two wires, so as to keep the first coil and the second coil electrically separated. In detail, the electrical separation between the first coil and the second coil can be generated by composing the first coil and the second coil, which are different wires simultaneously wound around the assembling structure, and the tilt of the imaging lens set can be adjusted. Therefore, the first coil and the second coil, which are electrically separated, can be separately controlled to further improve the imaging quality.

The lower elastic element can include four elastic sheets electrically separated from each other. In particular, the elastic sheets are suitable for the mass production and the assembling, and the volume of the imaging lens driving module can be effectively reduced via the elastic sheets. Further, the elastic sheets can be electrically connected to the wire terminal of the first coil, the wire end of the first coil, the wire terminal of the second coil and the wire end of the second coil, respectively. In detail, the elastic sheets can be further electrically connected to the wire terminal of the top layer coil of the first coil, the wire end of the bottom layer coil of the first coil, the wire terminal of the top layer coil of the second coil and the wire end of the bottom layer coil of the second coil, respectively. Therefore, the elastic sheets can be kept in electrical separation, wherein two of the elastic sheets can be electrically connected to the first coil, and the other two of the elastic sheets can be electrically connected to the second coil. Hence, the precision of the tilt of the imaging lens set can be enhanced.

The coil pair includes a number of coil pairs and a number of wire terminals, the number of the coil pairs is M, the number of the wire terminals is N, and the following conditions can be satisfied: N/2=M; and 2≤N≤10. Therefore, the suitable range of the number of the coil pair can be obtained.

Each of the aforementioned features of the imaging lens driving module can be utilized in various combinations for achieving the corresponding effects.

The present disclosure provides an electronic device, which includes the aforementioned imaging lens driving module.

According to the aforementioned embodiment, specific examples are provided, and illustrated via figures.

1st Example

Figure 1B:
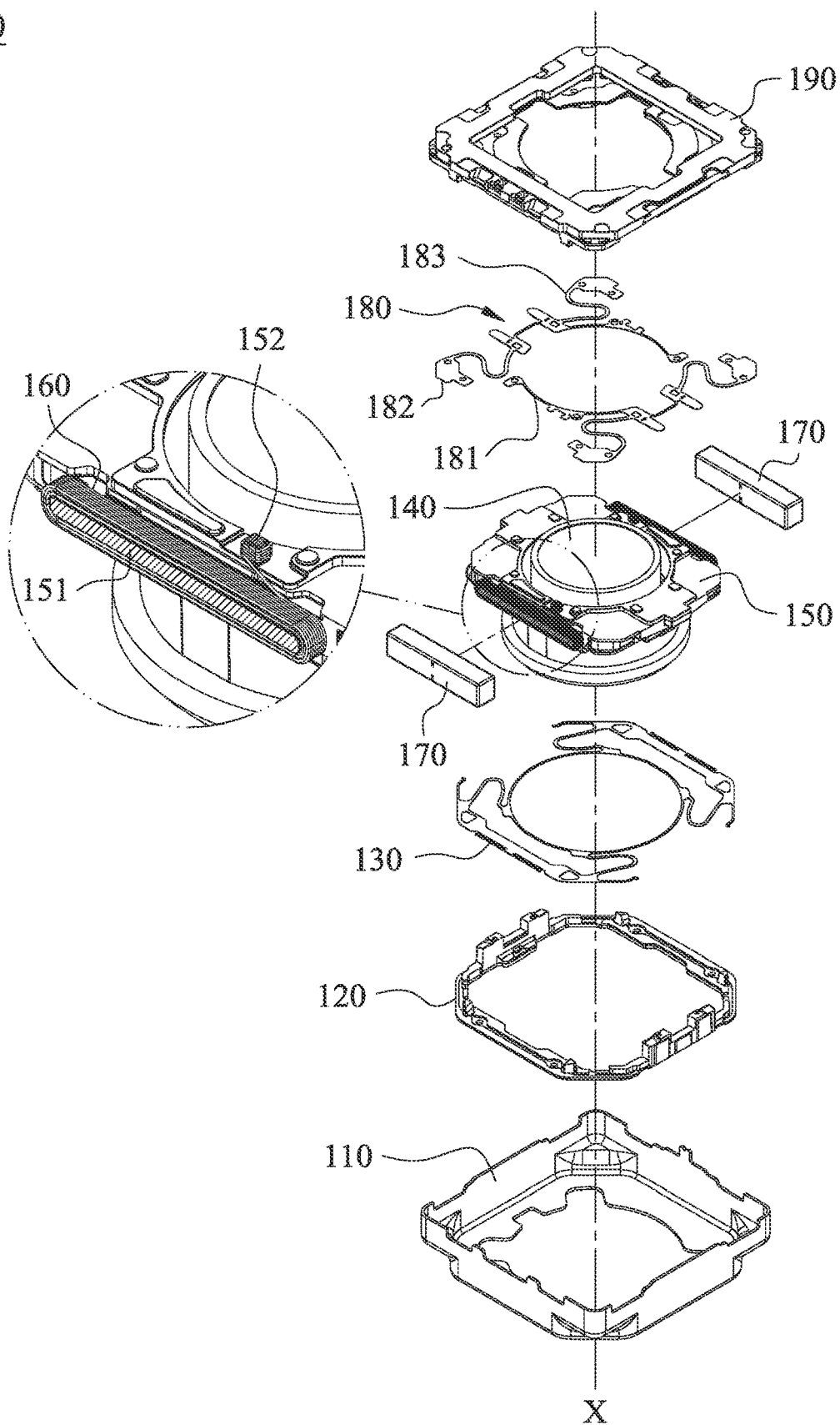
FIG. 1B is another exploded schematic view of the imaging lens driving module according to the 1st example in FIG. 1A.

FIG. 1A is an exploded schematic view of an imaging lens driving module 100 according to the 1st example of the present disclosure. FIG. 1B is another exploded schematic view of the imaging lens driving module 100 according to the 1st example in FIG. 1A. In FIGS. 1A and 1B, the imaging lens driving module 100 includes a cover 110, a gasket 120, a driving mechanism (its reference is omitted), an imaging lens set 140, a carrier element 150 and a base 190, wherein the imaging lens set 140 has an optical axis X.

The carrier element 150 is configured to dispose the imaging lens set 140, and includes an assembling structure 151, at least two columnar structures 152 and at least one abutting portion 153. The assembling structure 151 is disposed on an outer surface of the carrier element 150, and extends along a direction away from the optical axis X. The columnar structures 152 are disposed on the outer surface of the carrier element 150, and extend along a direction parallel to the optical axis X and a direction towards an image side of the imaging lens set 140. The abutting portion 153 and the assembling structure 151 are alternately disposed along a circumferential direction around the optical axis X. In detail, the carrier element 150 can be a coil holder, a lens carrier or elements which are combined with the aforementioned functions, and the columnar structures 152 and the carrier element 150 can be integrally formed, but the present disclosure is not limited thereto. The assembling tolerance between the elements can be reduced by the integral formation of the columnar structures 152 and the carrier element 150. Furthermore, the space utilization in the imaging lens driving module 100 can be enhanced by the alternate disposition of the abutting portion 153 and the assembling structure 151 along the circumferential direction around the optical axis X.

The driving mechanism is configured to drive the carrier element 150 to move along the direction parallel to the optical axis X, and includes at least one elastic element, at least one coil pair 160 and at least two magnets 170. The elastic element is coupled with the carrier element 150. A number of the elastic element can be two, and the elastic elements include an upper elastic element 130 and a lower elastic element 180. The upper elastic element 130 is disposed on an object side of the imaging lens set 140, the lower elastic element 180 is disposed on the image side of the imaging lens set 140, and the lower elastic element 180 corresponds to the upper elastic element 130. Therefore, the driving range of the driving mechanism can be defined. The coil pair 160 is disposed on the assembling structure 151 of the carrier element 150. The magnets 170 correspond to the coil pair 160, respectively. A driving magnetic force can be generated by the interaction between each of the magnets 170 and the coil pair 160, and the carrier element 150 can be driven to move along the direction parallel to the optical axis X by the driving mechanism. It should be mentioned that the gasket 120 can be configured to adjust the location of the upper elastic element 130 relative to the cover 110.

The lower elastic element 180 includes an inner-side portion 181, an outer-side portion 182 and an elastic connecting portion 183, wherein the inner-side portion 181 is coupled with the carrier element 150, the outer-side portion 182 is coupled with the base 190 of the imaging lens driving module 100, and the elastic connecting portion 183 is connected to the inner-side portion 181 and the outer-side portion 182. Therefore, the lower elastic element 180 can have the better coupled location to ensure the driving efficiency of the driving mechanism.

Figure 1C:
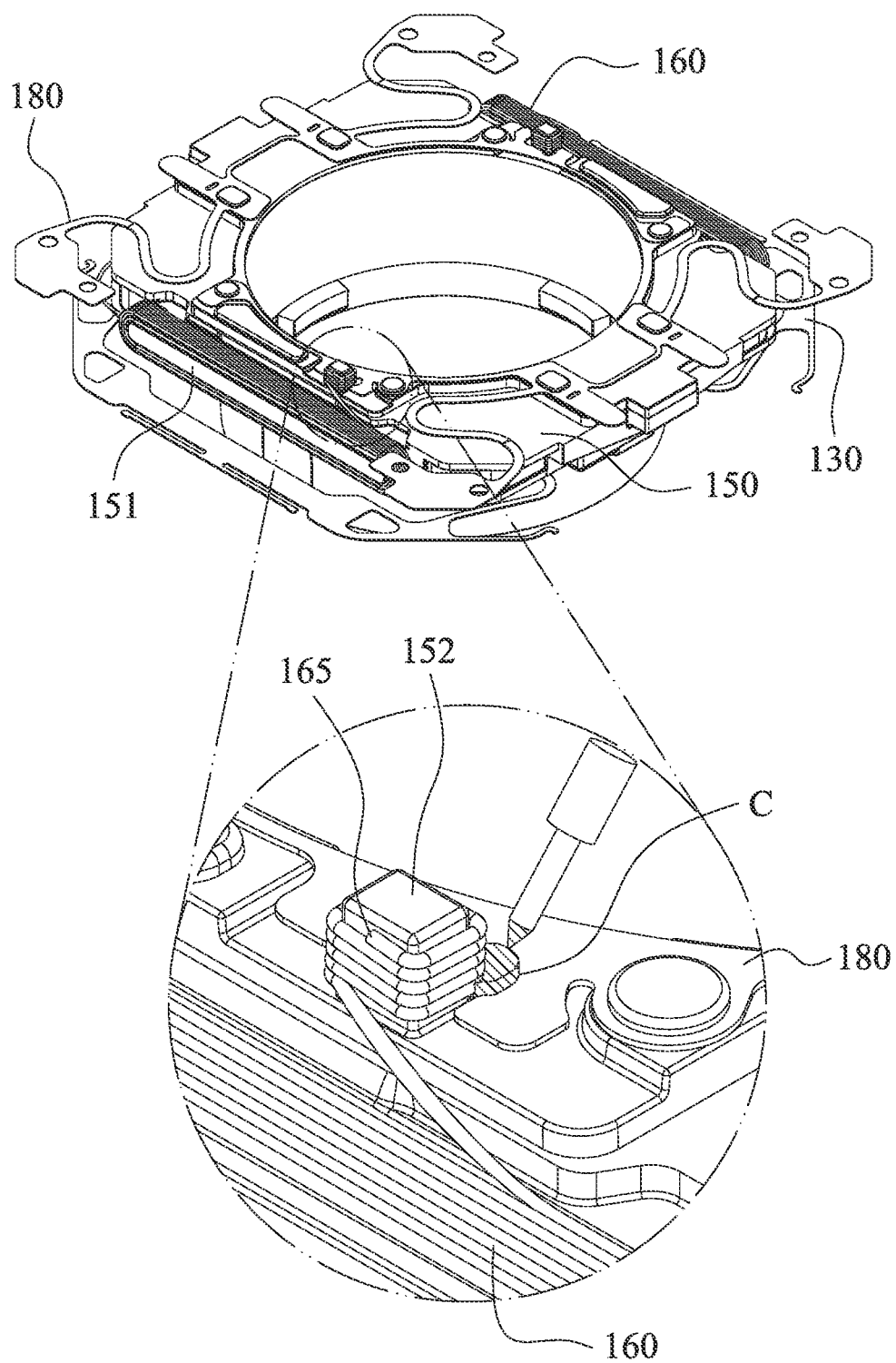
FIG. 1C is a partial schematic view of the imaging lens driving module according to the 1st example in FIG. 1A.
Figure 1D:
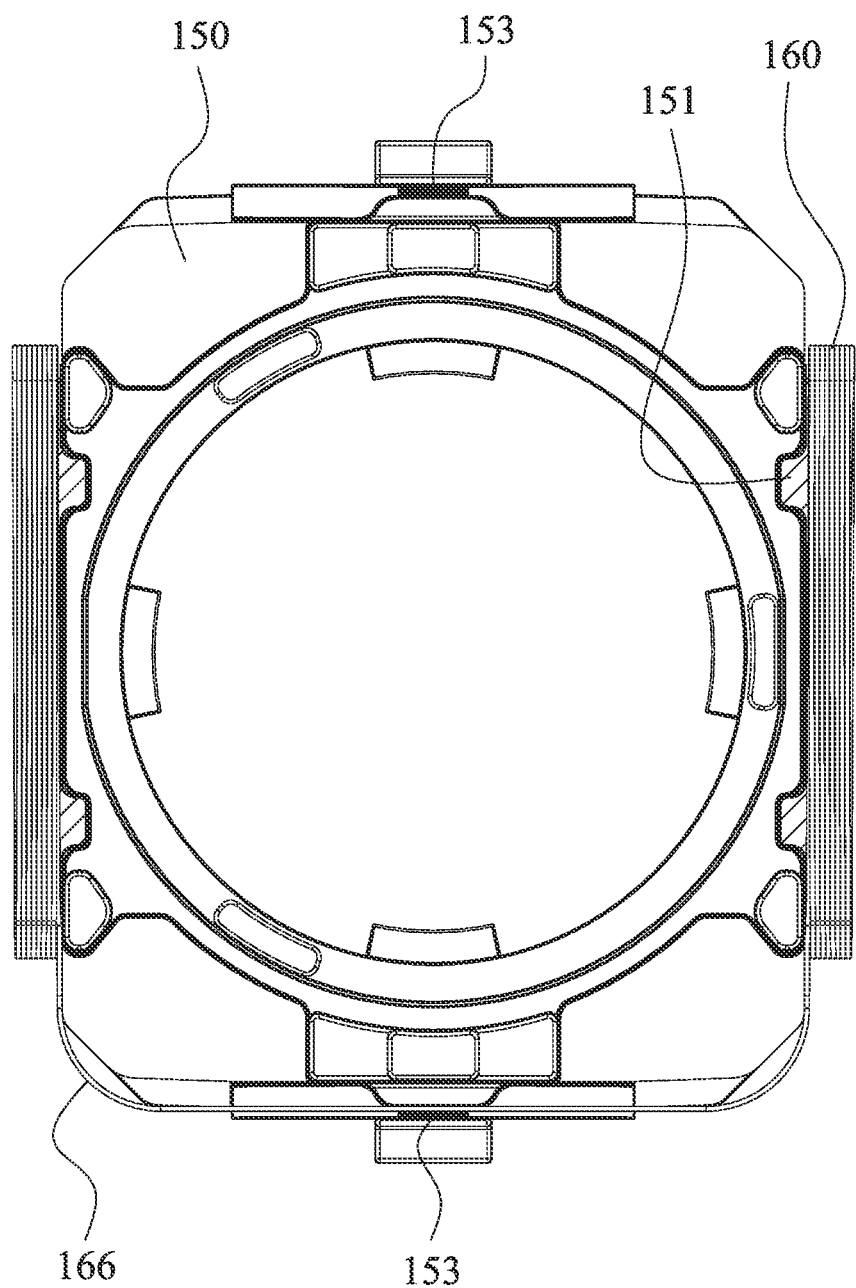
FIG. 1D is an object-side schematic view of the carrier element and the coil pair according to the 1st example in FIG. 1A.
Figure 1E:
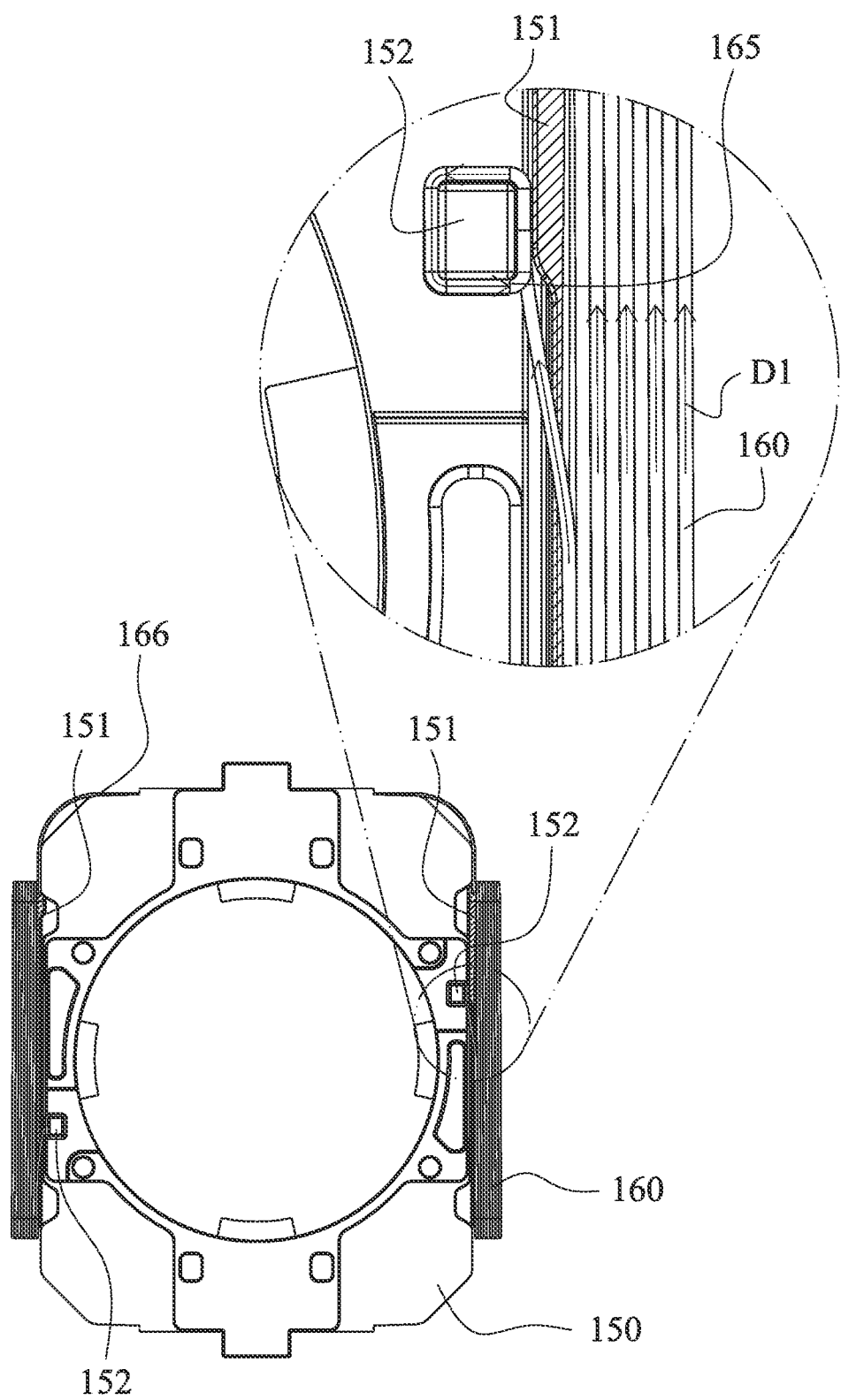
FIG. 1E is an image-side schematic view of the carrier element and the coil pair according to the 1st example in FIG. 1A.

FIG. 1C is a partial schematic view of the imaging lens driving module 100 according to the 1st example in FIG. 1A. FIG. 1D is an object-side schematic view of the carrier element 150 and the coil pair 160 according to the 1st example in FIG. 1A. FIG. 1E is an image-side schematic view of the carrier element 150 and the coil pair 160 according to the 1st example in FIG. 1A. FIGS. 1F to 1I are side schematic views of the carrier element 150 and the coil pair 160 according to the 1st example in FIG. 1A. FIG. 1J is a partial side schematic view of the carrier element 150 and the coil pair 160 according to the 1st example in FIG. 1A. FIG. 1K is a stacking and winding schematic view of the coil pair 160 according to the 1st example in FIG. 1A. FIG. 1L is a partial enlarged view of the carrier element 150 and the coil pair 160 according to the 1st example in FIG. 1A. In FIGS. 1C to 1L, the coil pair 160 includes a bottom layer coil 163 and a top layer coil 164. The bottom layer coil 163 is wound around and directly contacted with the assembling structure 151. The top layer coil 164 is stacked on and wound around the bottom layer coil 163 in a stacking and winding direction D2. The top layer coil 164 is farther away from the assembling structure 151 than the bottom layer coil 163 away from the assembling structure 151, and the top layer coil 164 overlaps the bottom layer coil 163 along the direction parallel to the optical axis X.

The coil pair 160 only has two wire terminals 165, and the wire terminals 165 are disposed on the top layer coil 164, respectively. The wire terminals 165 of the top layer coil 164 are electrically connected to the elastic element of the driving mechanism, wherein the wire terminals 165 of the top layer coil 164 can be electrically connected to the elastic element of the driving mechanism by welding or dispensing, but the present disclosure is not limited thereto. In FIG. 1C, according to the 1st example, the wire terminals 165 of the top layer coil 164 are electrically connected to the lower elastic element 180 of the driving mechanism, and the wire terminals 165 of the top layer coil 164 can be electrically connected to the lower elastic element 180 of the driving mechanism by dispensing to form an electrical connecting portion C connected to the lower elastic element 180. Therefore, the wire terminals 165 can be electrically connected to other elements so as to promote the design margin of the product station.

Furthermore, the wire terminals 165 of the top layer coil 164 are electrically connected to the lower elastic element 180 except the outer-side portion 182. That is, the wire terminals 165 of the top layer coil 164 are electrically connected to the inner-side portion 181 of the lower elastic element 180 and the elastic connecting portion 183 of the lower elastic element 180, but the present disclosure is not limited thereto. Therefore, the better location of the electrical connection can be obtained, and the aforementioned disposition is favorable for the compact size of the imaging lens driving module 100.

Figure 1F:
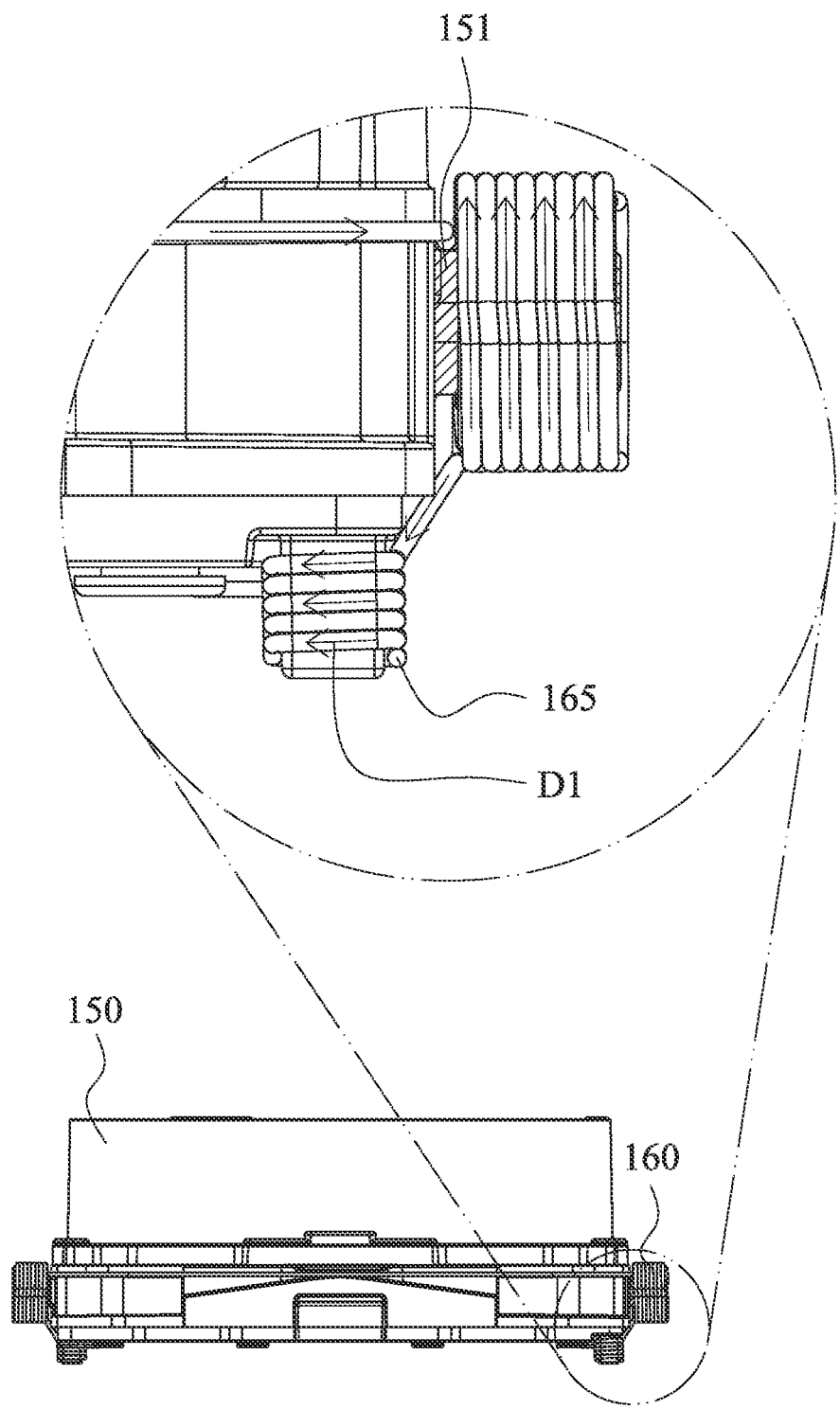
FIG. 1F is a side schematic view of the carrier element and the coil pair according to the 1st example in FIG. 1A.
Figure 1G:
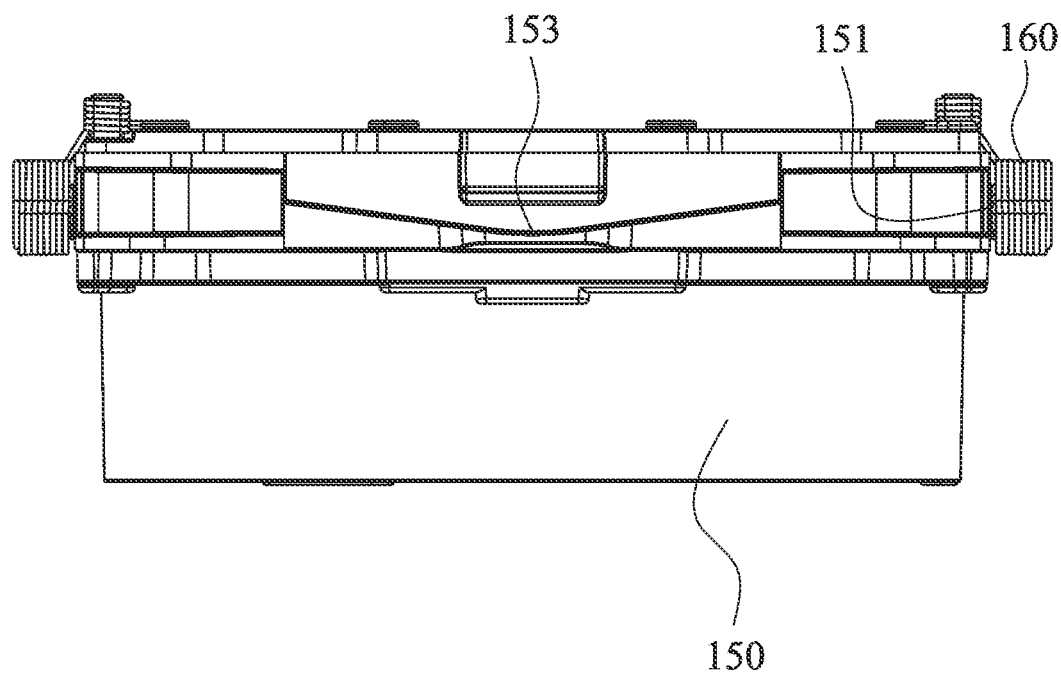
FIG. 1G is another side schematic view of the carrier element and the coil pair according to the 1st example in FIG. 1A.
Figure 1H:
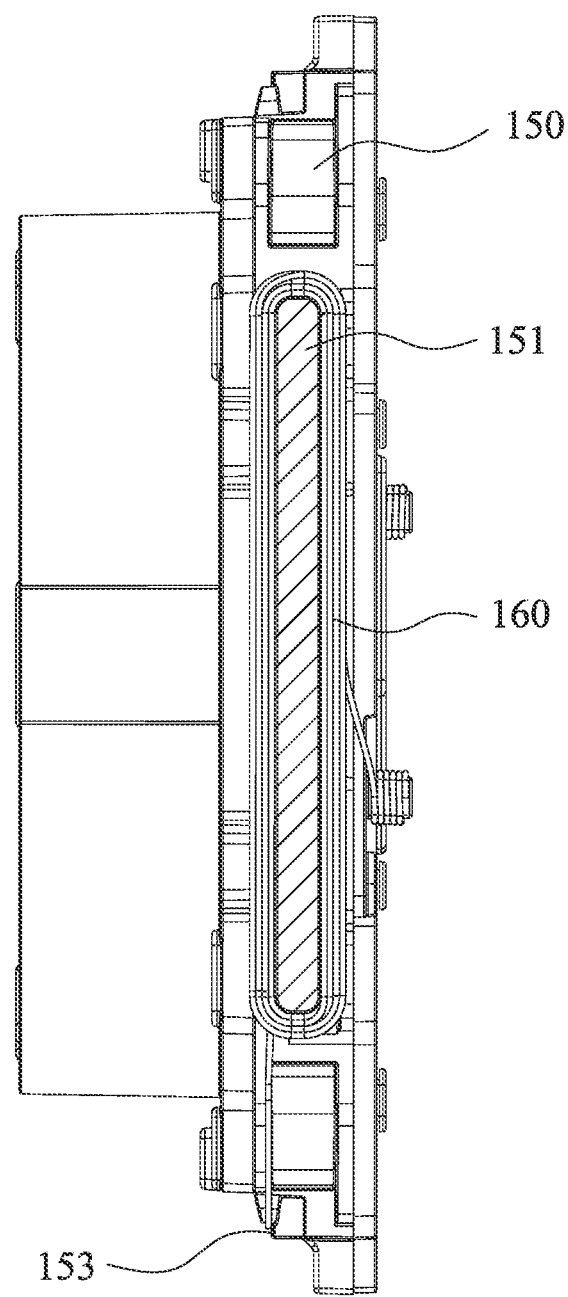
FIG. 1H is another side schematic view of the carrier element and the coil pair according to the 1st example in FIG. 1A.
Figure 1I:
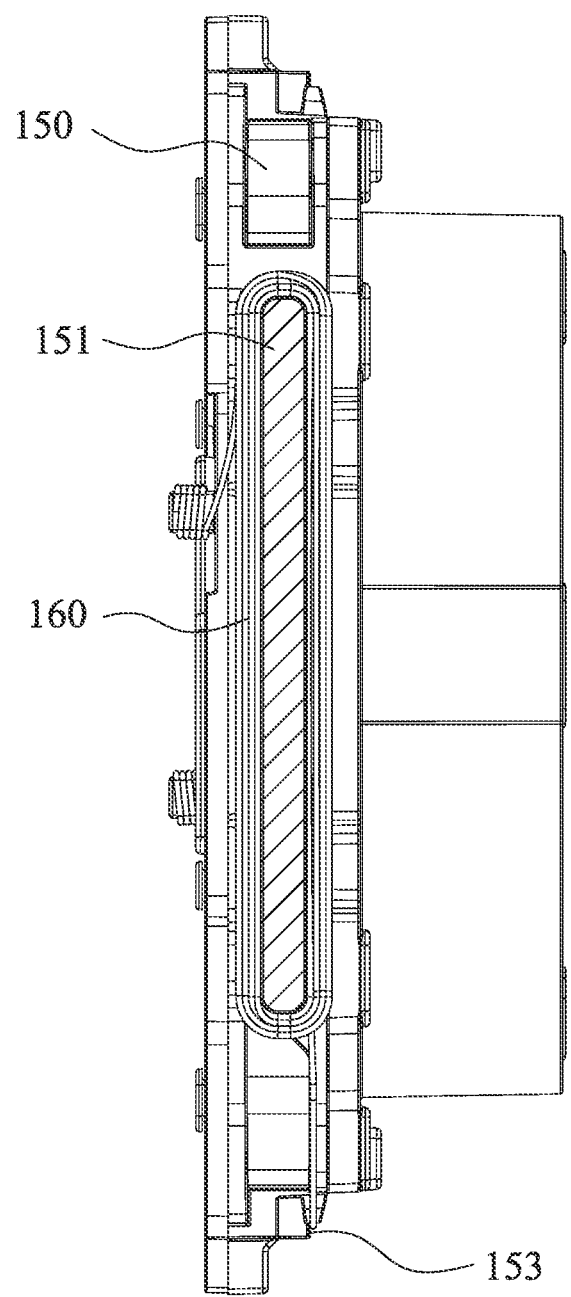
FIG. 1I is another side schematic view of the carrier element and the coil pair according to the 1st example in FIG. 1A.
Figure 1J:
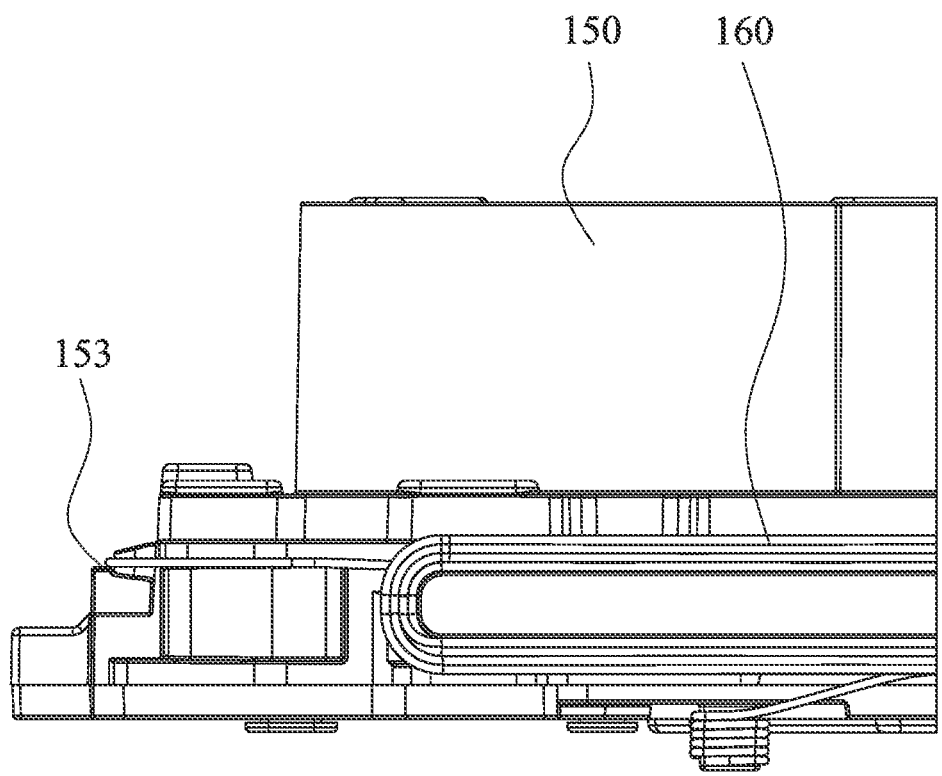
FIG. 1J is a partial side schematic view of the carrier element and the coil pair according to the 1st example in FIG. 1A.
Figure 1K:
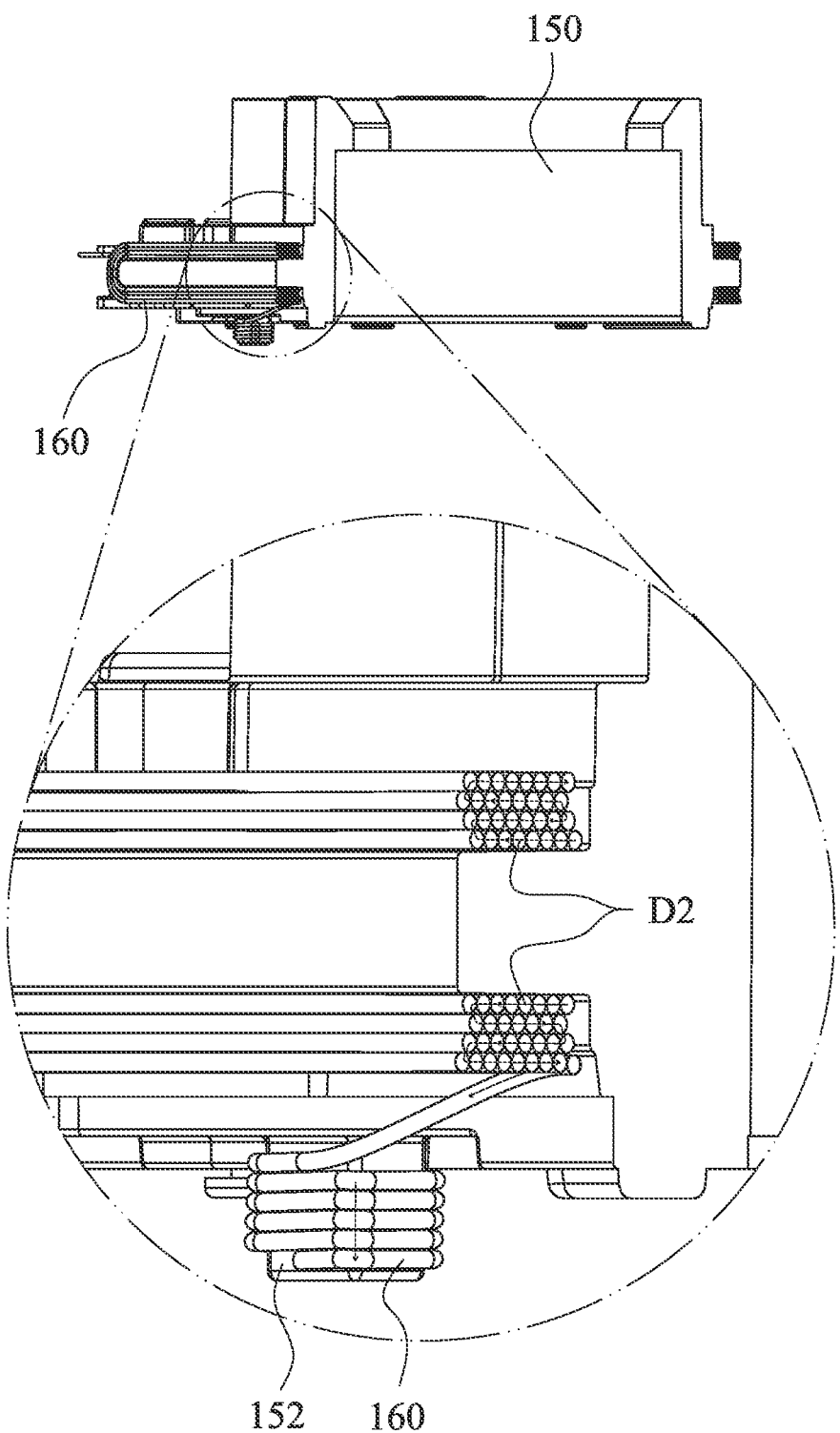
FIG. 1K is a stacking and winding schematic view of the coil pair according to the 1st example in FIG. 1A.
Figure 1L:
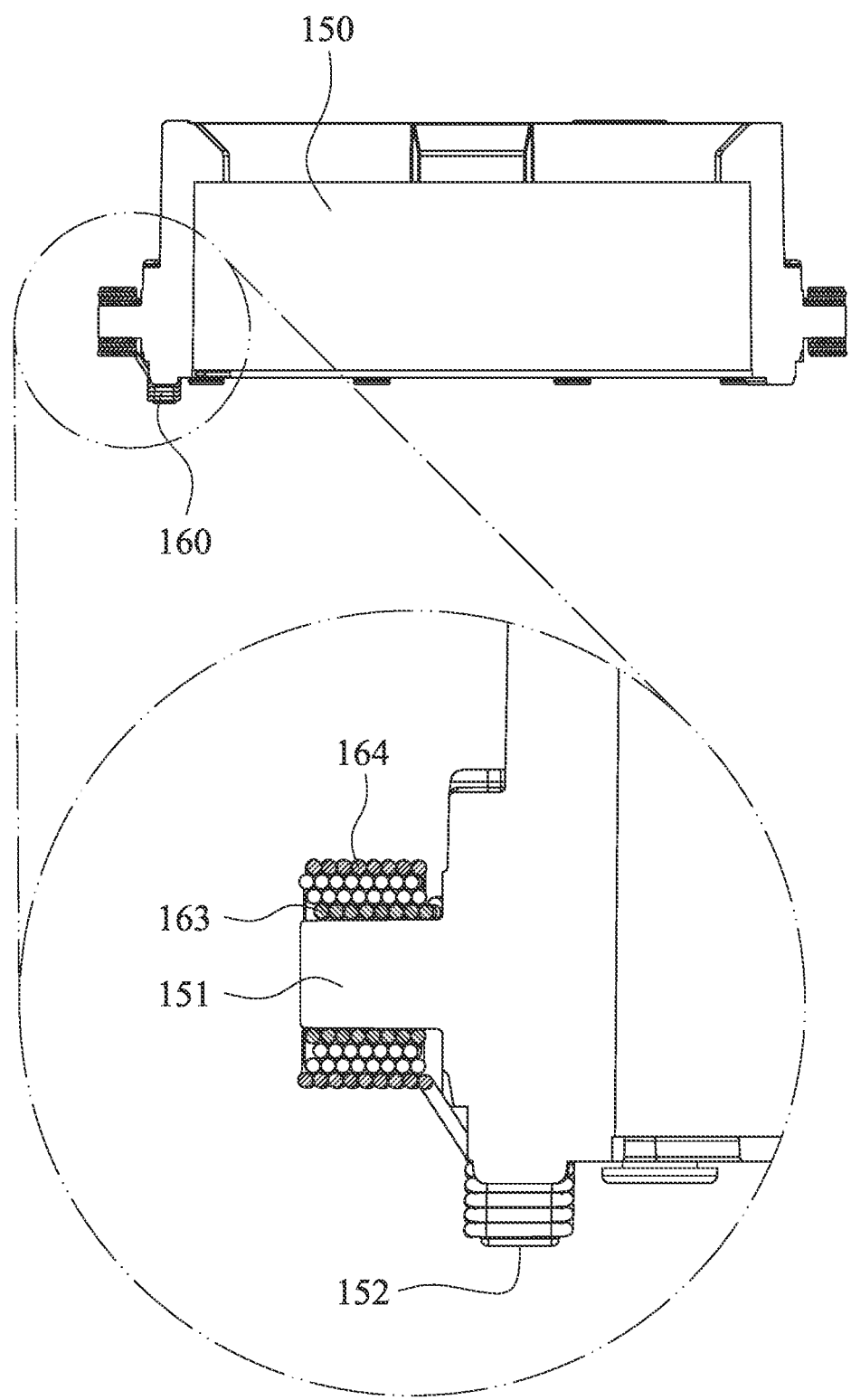
FIG. 1L is a partial enlarged view of the carrier element and the coil pair according to the 1st example in FIG. 1A.

In FIGS. 1E, 1F and 1L, the coil pair 160 of the driving mechanism can be a wire composed by simultaneously winding around the assembling structure 151 of the carrier element 150 from the bottom layer coil 163 towards the wire terminals 165 of the top layer coil 164 along a coiling direction D1. In detail, the bottom layer coil 163 is composed by the wire, and the top layer coil 164 has the wire terminals 165. Hence, the coil pair 160 is composed of the same wire. Forming the coil pair 160 by the same wire simultaneously winding around is favorable for reducing the manufacturing process and lowering the cycle time of the product.

In FIGS. 1C and 1E, each of the wire terminals 165 of the top layer coil 164 can be wound around and directly contacted with each of the columnar structures 152. In particular, the wire terminals 165 can be the wire wound around an end area (that is, the columnar structure 152) of the carrier element 150, and the wire terminals 165 can be disconnected, and one of the wire terminals 165 is exposed in the air. In detail, the required tension of the wire for fixing the coil pair 160 is provided by the wire terminals 165 of the top layer coil 164 wound around the columnar structure 152. Therefore, the wire can be prevented from loosing from the carrier element 150 to promote the yield rate.

Figure 1M:
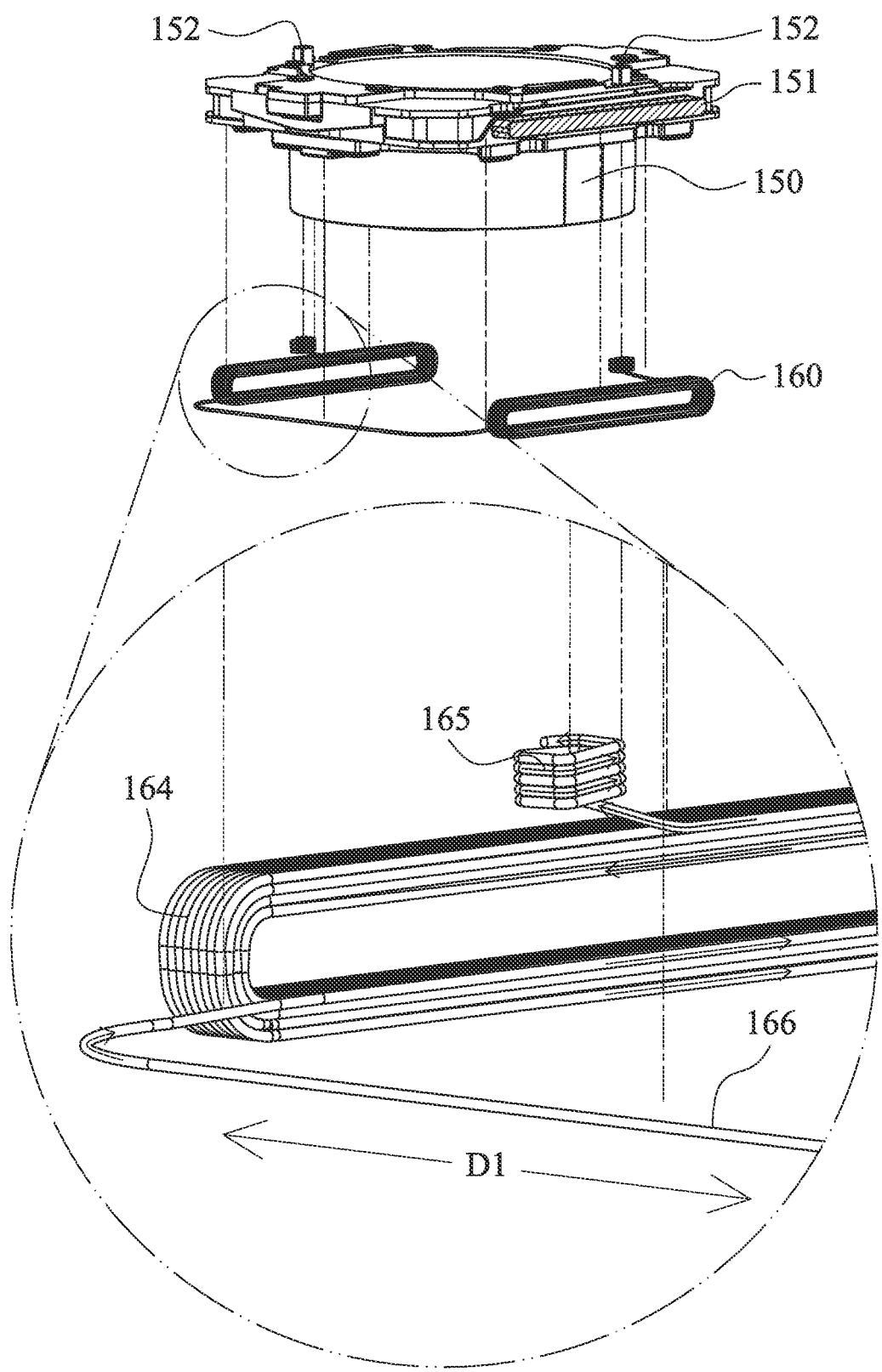
FIG. 1M is a schematic view of the carrier element and the coil pair according to the 1st example in FIG. 1A.
Figure 1N:
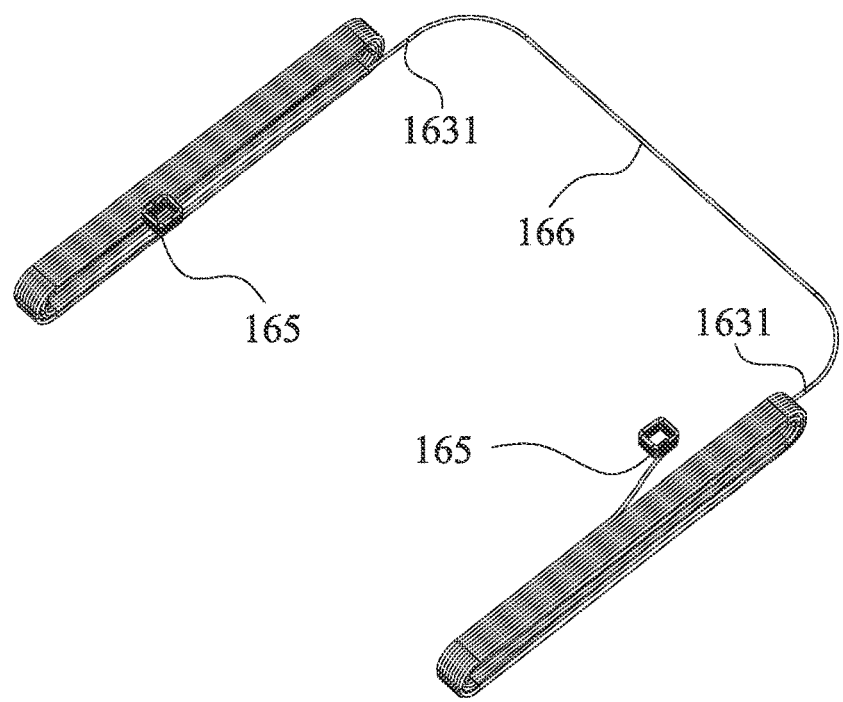
FIG. 1N is a schematic view of the coil pair according to the 1st example in FIG. 1M.
Figure 1O:
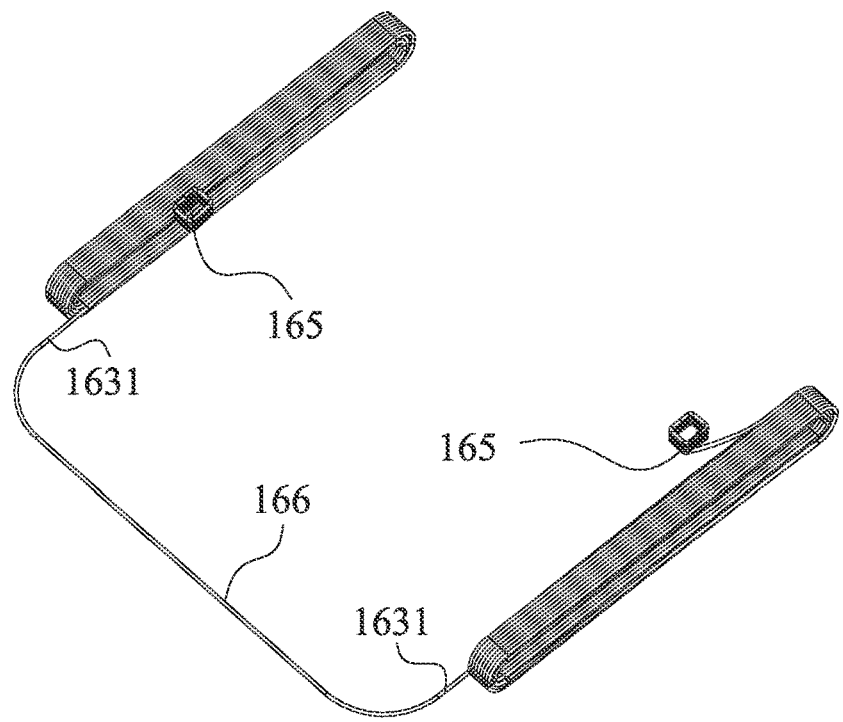
FIG. 1O is another schematic view of the coil pair according to the 1st example in FIG. 1M.
Figure 1P:
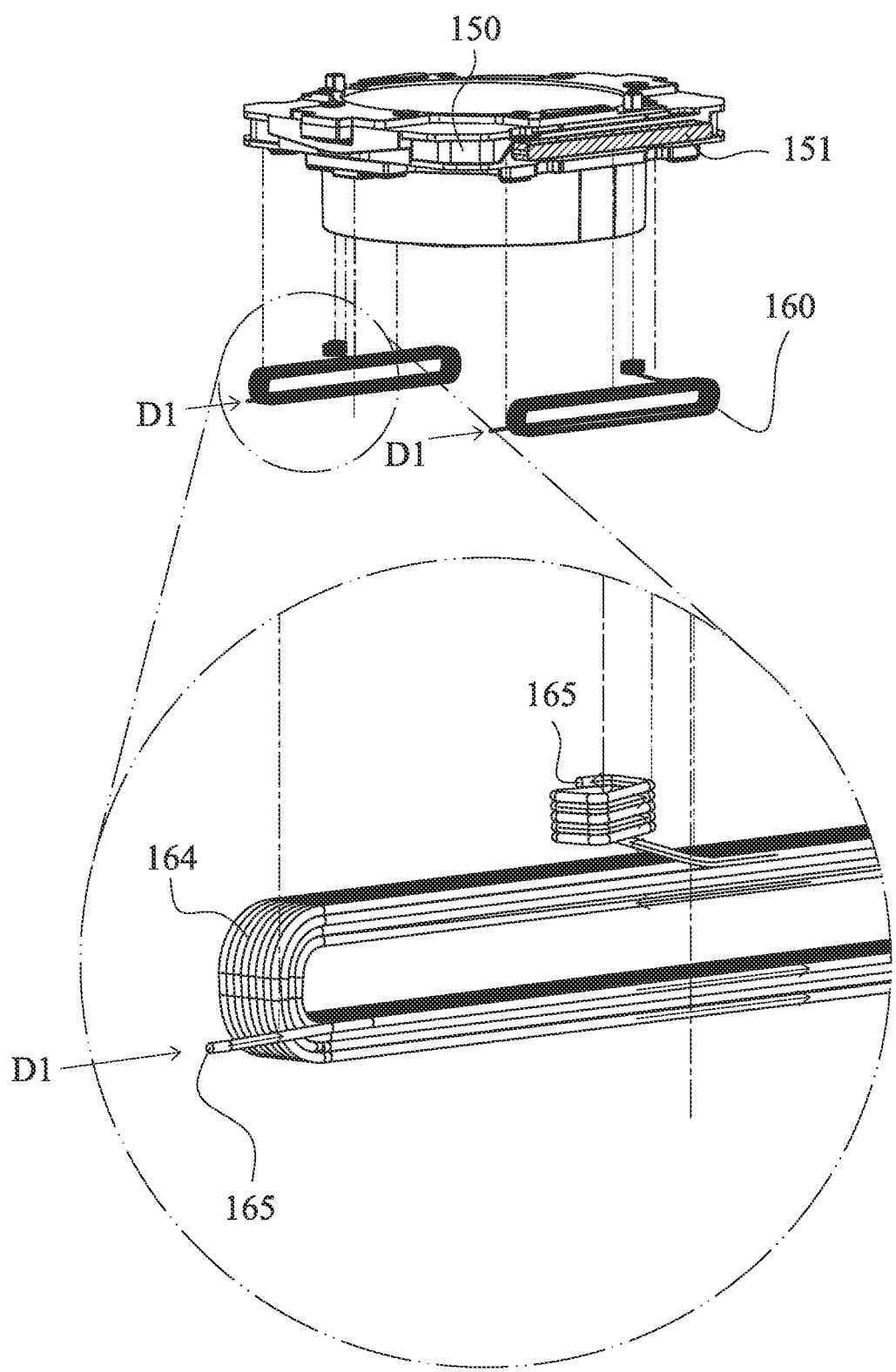
FIG. 1P is another schematic view of the carrier element and the coil pair according to the 1st example in FIG. 1A.
Figure 1Q:
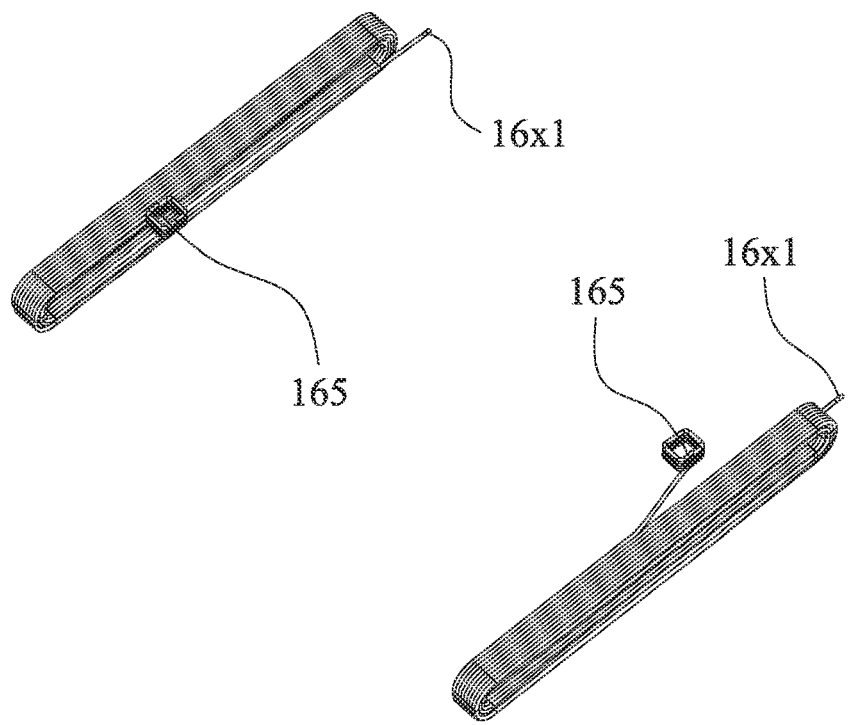
FIG. 1Q is a schematic view of the coil pair according to the 1st example in FIG. 1P.
Figure 1R:
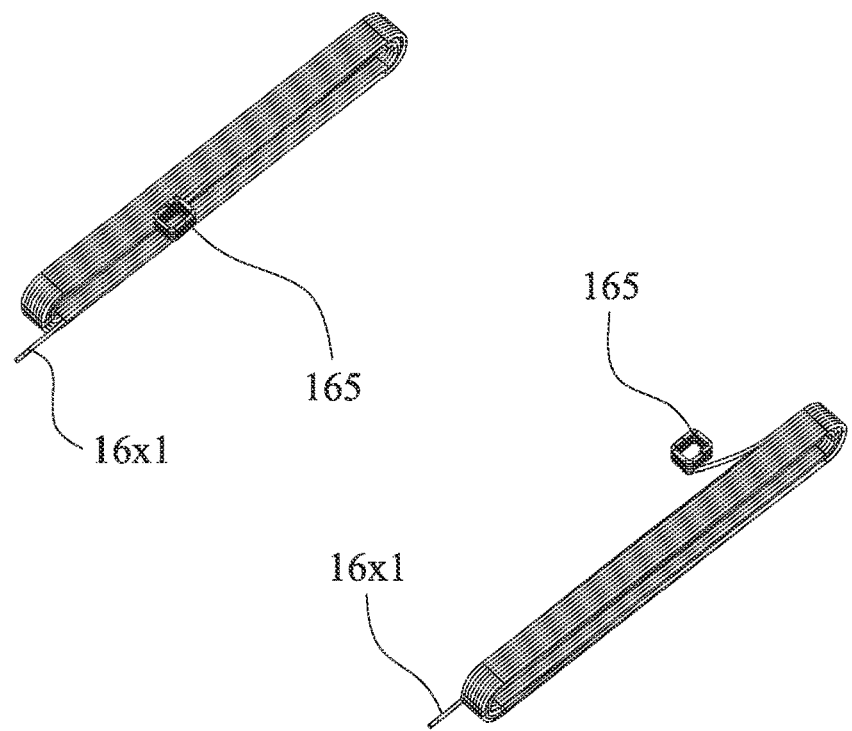
FIG. 1R is another schematic view of the coil pair according to the 1st example in FIG. 1P.

FIG. 1M is a schematic view of the carrier element 150 and the coil pair 160 according to the 1st example in FIG. 1A. FIGS. 1N and 1O are schematic views of the coil pair 160 according to the 1st example in FIG. 1M. FIG. 1P is another schematic view of the carrier element 150 and the coil pair 160 according to the 1st example in FIG. 1A. FIGS. 1Q and 1R are schematic views of the coil pair 160 according to the 1st example in FIG. 1P. In FIGS. 1L to 1R, the bottom layer coil 163 of the coil pair 160 only has two wire ends 16x1, and the coil pair 160 further includes a connecting wire 166, wherein each of two wire ends 1631 of the connecting wire 166 is connected to each of the wire ends 16x1 of the bottom layer coil 163 so as to keep the bottom layer coil 163 electrically connected.

Moreover, the connecting wire 166 can be a portion of the coil pair 160, but the present disclosure is not limited thereto. Therefore, the feasibility of the coil pair 160 composed of the wire which is continuous can be provided.

The connecting wire 166 of the coil pair 160 is directly contacted with a separation point (its reference numeral is omitted) of the abutting portion 153 of the carrier element 150. By the separation point, the process of the automatic optical inspection can be more precise and faster, and the wire length of the coil pair 160 can be effectively controlled to lower the manufacturing cost.

According to the 1st example, the coil pair includes one coil pair and two wire terminals, but the present disclosure is not limited thereto.

2nd Example

Figure 2A:
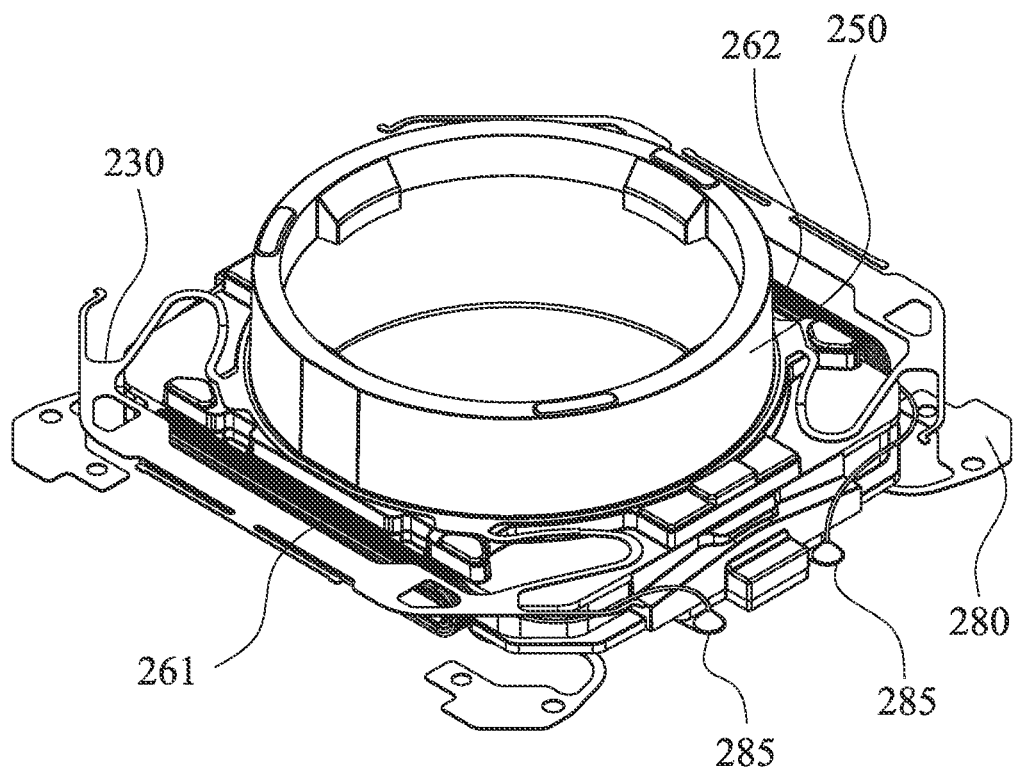
FIG. 2A is a partial schematic view of an imaging lens driving module according to the 2nd example of the present disclosure.
Figure 2B:
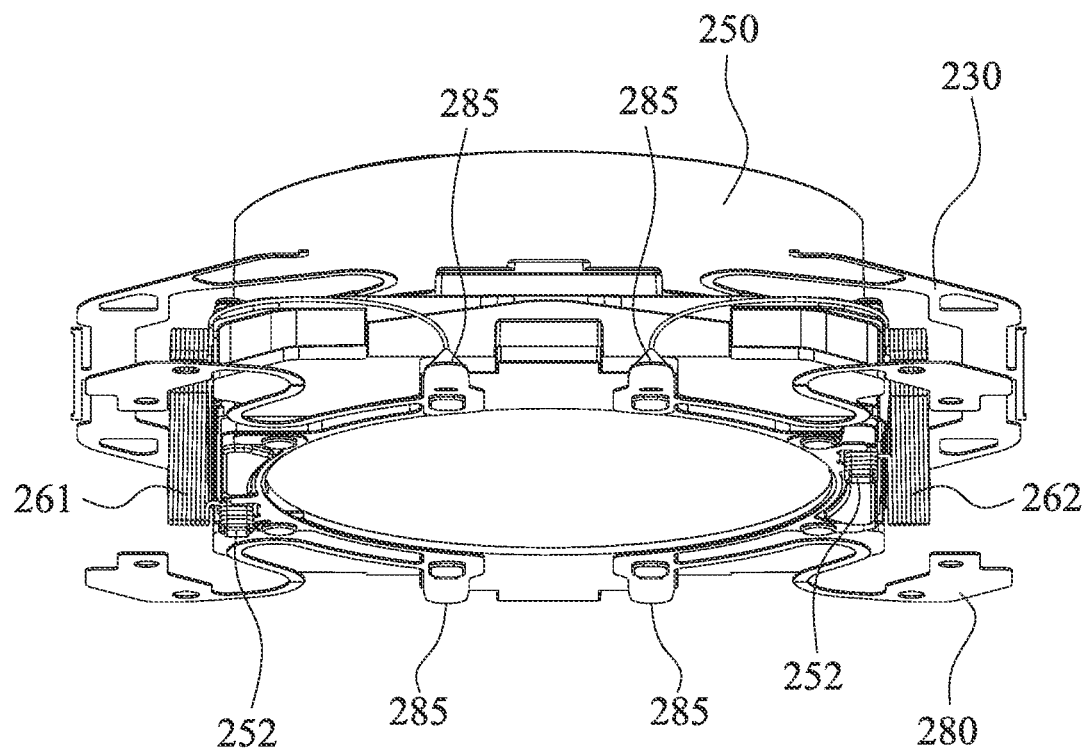
FIG. 2B is another partial schematic view of the imaging lens driving module according to the 2nd example in FIG. 2A.

FIG. 2A is a partial schematic view of an imaging lens driving module according to the 2nd example of the present disclosure. FIG. 2B is another partial schematic view of the imaging lens driving module according to the 2nd example in FIG. 2A. In FIGS. 2A and 2B, the imaging lens driving module (its reference is omitted) includes a cover (not shown), a gasket (not shown), a driving mechanism (its reference is omitted), an imaging lens set (not shown), a carrier element 250 and a base (not shown), wherein the imaging lens set has an optical axis (its reference is omitted).

Figure 2C:
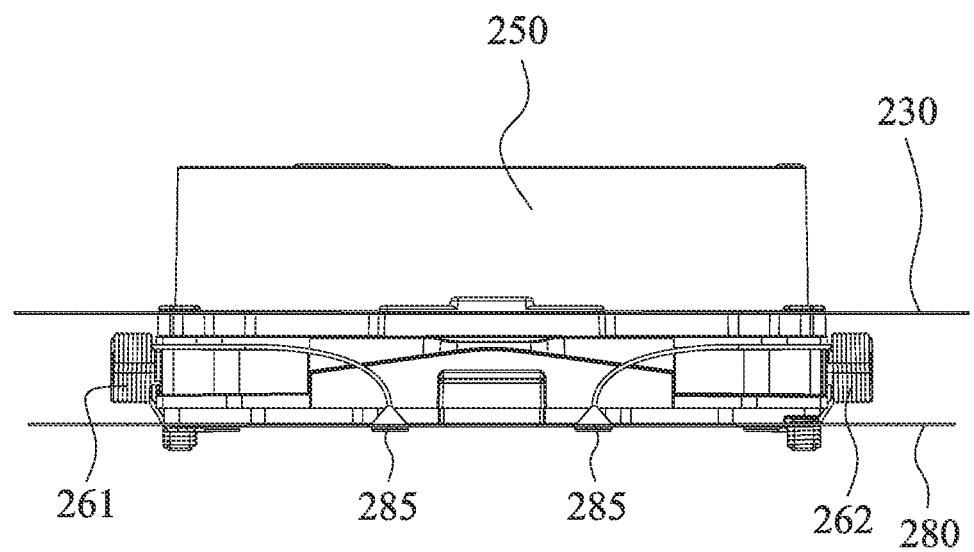
FIG. 2C is a partial side schematic view of the imaging lens driving module according to the 2nd example in FIG. 2A.
Figure 2D:
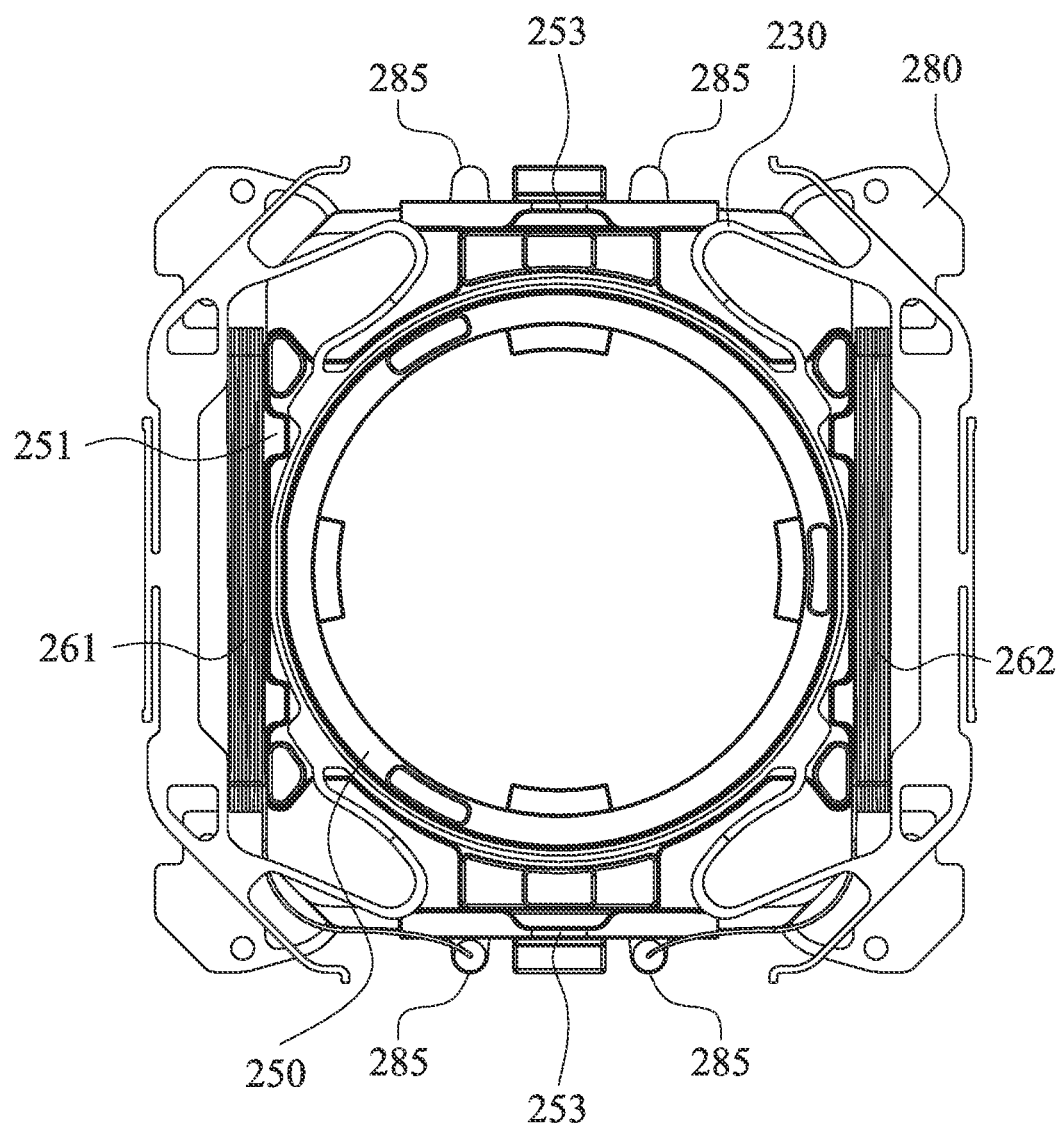
FIG. 2D is a partial object-side schematic view of the imaging lens driving module according to the 2nd example in FIG. 2A.

The carrier element 250 is configured to dispose the imaging lens set, and includes an assembling structure 251 (as shown in FIG. 2D), at least two columnar structures 252 and at least one abutting portion 253 (as shown in FIG. 2D). The assembling structure 251 is disposed on an outer surface of the carrier element 250, and extends along a direction away from the optical axis. The columnar structures 252 are disposed on the outer surface of the carrier element 250, and extend along a direction parallel to the optical axis and a direction towards an image side of the imaging lens set. The abutting portion 253 and the assembling structure 251 are alternately disposed along a circumferential direction around the optical axis. In detail, the carrier element 250 can be a coil holder, a lens carrier or elements which are combined with the aforementioned functions, and the columnar structures 252 and the carrier element 250 can be integrally formed, but the present disclosure is not limited thereto. The assembling tolerance between the elements can be reduced by the integral formation of the columnar structures 252 and the carrier element 250. Furthermore, the space utilization in the imaging lens driving module can be enhanced by the alternate disposition of the abutting portion 253 and the assembling structure 251 along the circumferential direction around the optical axis.

The driving mechanism is configured to drive the carrier element 250 to move along the direction parallel to the optical axis, and includes at least one elastic element, at least one coil pair (its reference numeral is omitted) and at least two magnets (not shown). The elastic element is coupled with the carrier element 250. A number of the elastic element can be two, and the elastic elements include an upper elastic element 230 and a lower elastic element 280. The upper elastic element 230 is disposed on an object side of the imaging lens set, the lower elastic element 280 is disposed on the image side of the imaging lens set, and the lower elastic element 280 corresponds to the upper elastic element 230. Therefore, the driving range of the driving mechanism can be defined. The coil pair is disposed on the assembling structure 251 of the carrier element 250.

The lower elastic element 280 can include four elastic sheets (its reference numeral is omitted) electrically separated from each other. In particular, the elastic sheets are suitable for the mass production and the assembling, and the volume of the imaging lens driving module can be effectively reduced via the elastic sheets.

Figure 2E:
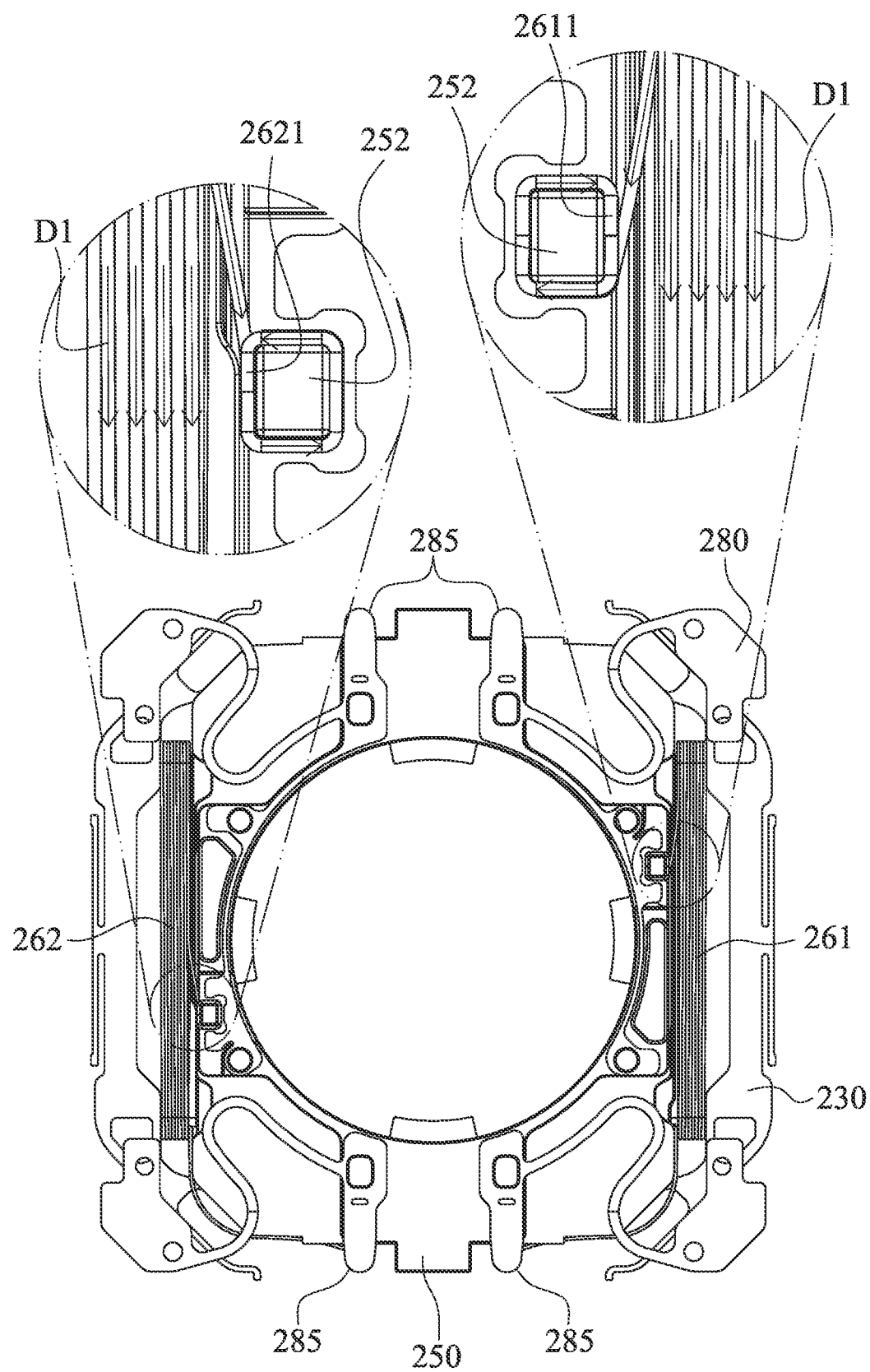
FIG. 2E is a partial image-side schematic view of the imaging lens driving module according to the 2nd example in FIG. 2A.

FIG. 2C is a partial side schematic view of the imaging lens driving module according to the 2nd example in FIG. 2A. FIG. 2D is a partial object-side schematic view of the imaging lens driving module according to the 2nd example in FIG. 2A. FIG. 2E is a partial image-side schematic view of the imaging lens driving module according to the 2nd example in FIG. 2A. In FIGS. 2A to 2E, the coil pair includes a first coil 261 and a second coil 262, wherein the first coil 261 is disposed on the assembling structure 251 of the carrier element 250, the second coil 262 is disposed on the assembling structure 251 of the carrier element 250, and the second coil 262 corresponds to the first coil 261.

Each of the first coil 261 and the second coil 262 includes a bottom layer coil (its reference numeral is omitted) and a top layer coil (its reference numeral is omitted), wherein the bottom layer coil is wound around and directly contacted with the assembling structure 251; the top layer coil is stacked on and wound around the bottom layer coil, the top layer coil is farther away from the assembling structure 251 than the bottom layer coil away from the assembling structure 251, and the top layer coil overlaps the bottom layer coil along the direction parallel to the optical axis.

In FIG. 2E, a coiling direction D1 of the first coil 261 and a coiling direction D1 of the second coil 262 are the same during observing from the first coil 261 towards the second coil 262. In particular, both of the coiling direction D1 of the first coil and the coiling direction D1 of the second coil are clockwise or counterclockwise. By the same coiling direction D1, the coiling process can be simplified to further reduce the time cost.

The first coil 261 and the second coil 262 can be composed of two wires, so as to keep the first coil 261 and the second coil 262 electrically separated. In detail, the electrical separation between the first coil 261 and the second coil 262 can be generated by composing the first coil 261 and the second coil 262, which are different wires simultaneously wound around the assembling structure 251, and the tilt of the imaging lens set can be adjusted. Therefore, the first coil 261 and the second coil 262, which are electrically separated, can be separately controlled to further improve the imaging quality.

The elastic sheets can be electrically connected to a wire terminal 2611 of the first coil 261 and a wire terminal 2621 of the second coil 262, respectively. Elastic sheet connecting portions 285 of the elastic sheets can be electrically connected to a wire end (its reference numeral is omitted) of the first coil 261 and a wire end (its reference numeral is omitted) of the second coil 262, respectively. Further, the electrical connection is welding or dispensing, but the present disclosure is not limited thereto. Moreover, the elastic sheets can be further electrically connected to the wire terminal 2611 of the top layer coil of the first coil 261, the wire end of the bottom layer coil of the first coil 261, the wire terminal 2621 of the top layer coil of the second coil 262 and the wire end of the bottom layer coil of the second coil 262, respectively. According to the 2nd example, the elastic sheets are electrically connected to the wire terminal 2611 of the first coil 261 and the wire terminal 2621 of the second coil 262 by welding. The elastic sheet connecting portions 285 of the elastic sheets are electrically connected to the wire end of the first coil 261 and the wire end of the second coil 262 by welding. Therefore, the elastic sheets can be kept in electrical separation, wherein two of the elastic sheets can be electrically connected to the first coil 261, and the other two of the elastic sheets can be electrically connected to the second coil 262. Hence, the precision of the tilt of the imaging lens set can be enhanced.

Furthermore, the required tension of the wire for fixing the coil pair is provided by the wire terminal 2611 of the top layer coil of the first coil 261 and the wire terminal 2621 of the top layer coil of the second coil 262 wound around the columnar structures 252 of the carrier element 250. Therefore, the wire can be prevented from loosing from the carrier element 250 to promote the yield rate.

According to the 2nd example, the coil pair includes one coil pair and two wire terminals, but the present disclosure is not limited thereto.

Further, all of other structures and dispositions according to the 2nd example are the same as the structures and the dispositions according to the 1st example, and will not be described again herein.

3rd Example

Figure 3A:
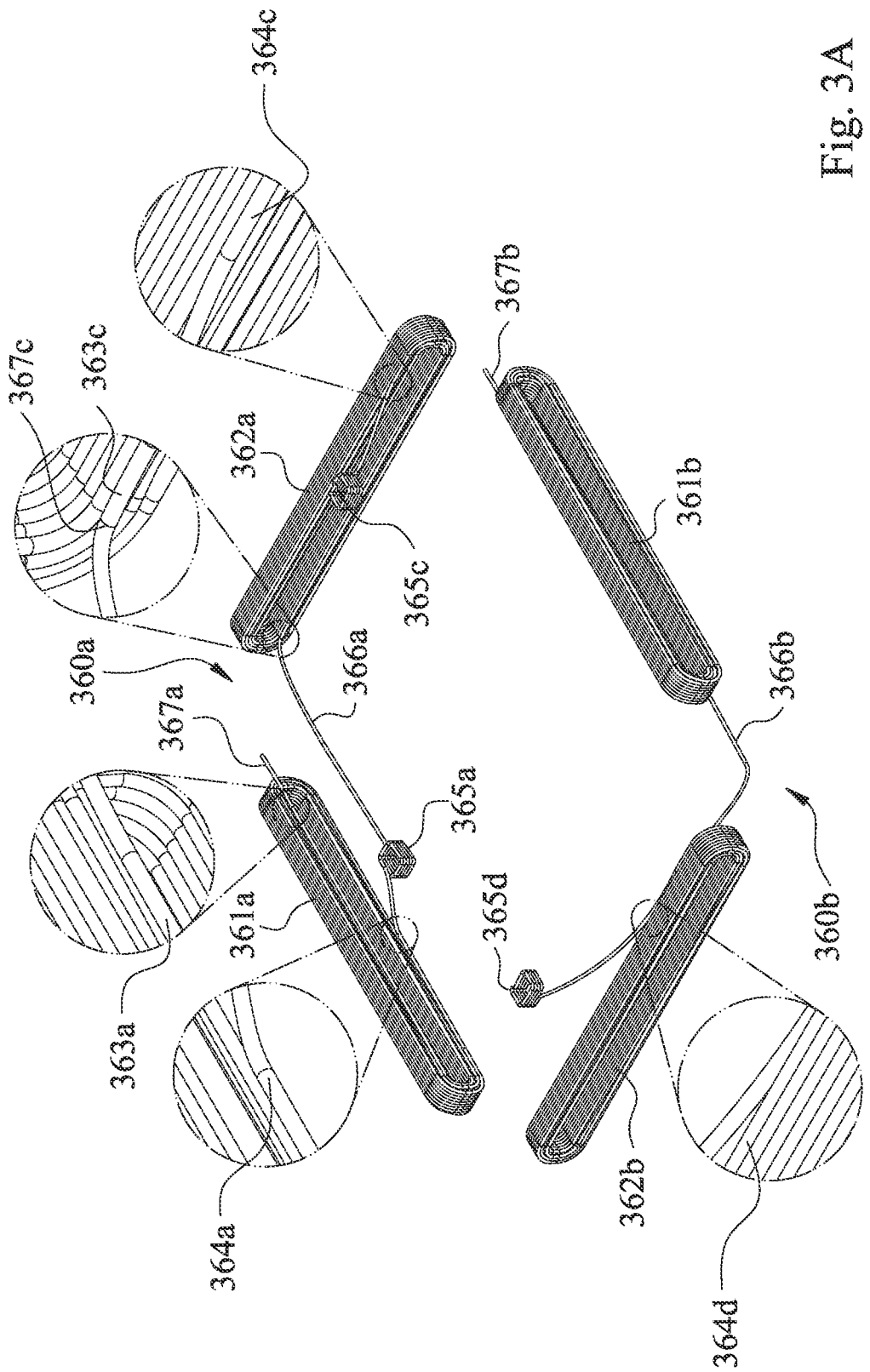
FIG. 3A is a schematic view of coil pairs according to the 3rd example of the present disclosure.
Figure 3B:
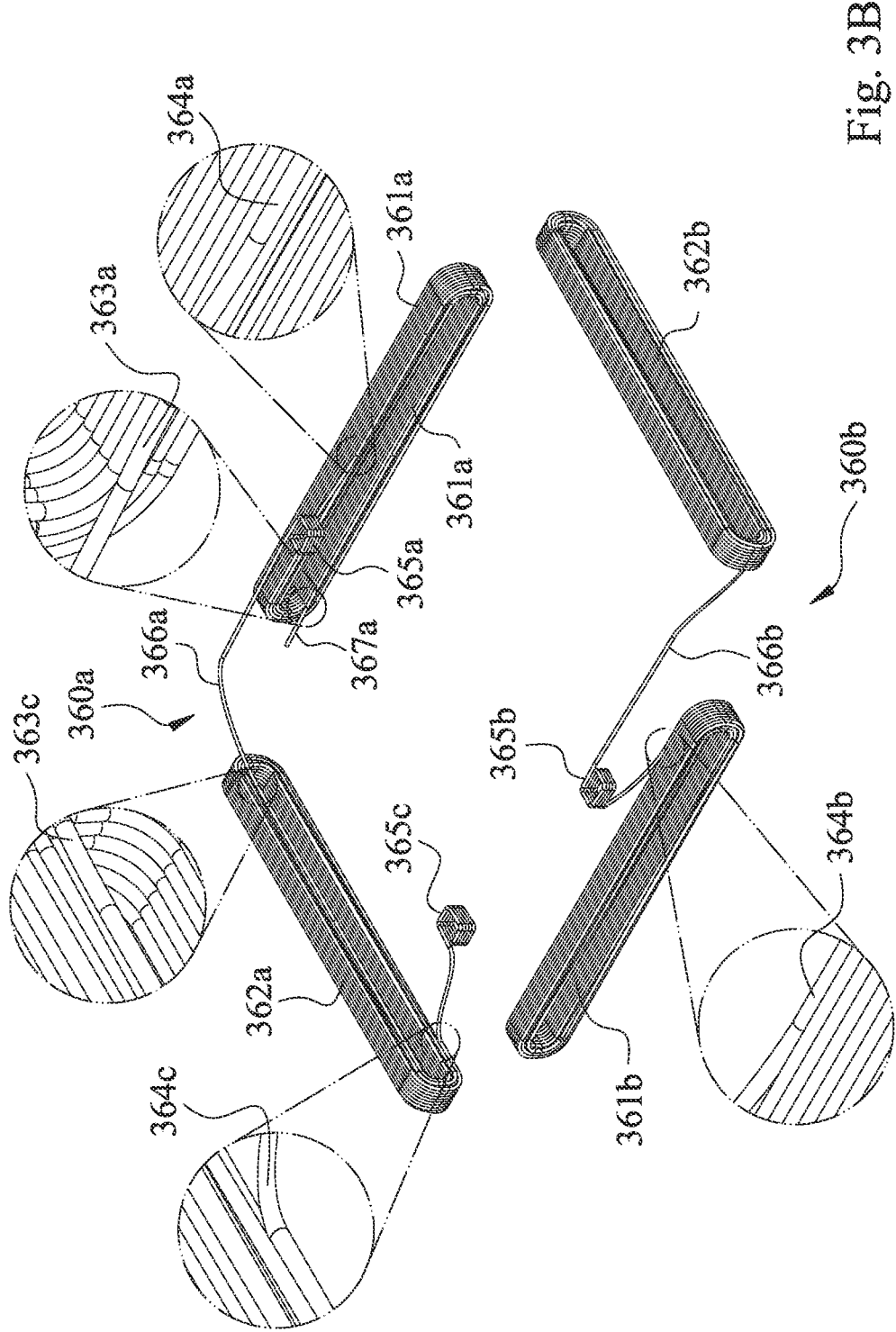
FIG. 3B is another schematic view of the coil pairs according to the 3rd example in FIG. 3A.

FIG. 3A is a schematic view of coil pairs 360a, 360b according to the 3rd example of the present disclosure. FIG. 3B is another schematic view of the coil pairs 360a, 360b according to the 3rd example in FIG. 3A. In FIGS. 3A and 3B, the coil pair 360a includes a first coil 361a and a second coil 362a, and the coil pair 360b includes a first coil 361b and a second coil 362b, wherein the first coils 361a, 361b are disposed on a carrier element (not shown) of a driving mechanism (not shown), the second coils 362a, 362b are disposed on the carrier element of the driving mechanism, and the second coils 362a, 362b and the first coils 361a, 361b are alternately disposed, respectively.

Each of the first coil and the second coil includes a bottom layer coil and a top layer coil. According to the 3rd example, the first coil 361a includes a bottom layer coil 363a and a top layer coil 364a, and the second coil 362a includes a bottom layer coil 363c and a top layer coil 364c; the first coil 361b includes a bottom layer coil 363b (as shown in FIG. 3E) and a top layer coil 364b, and the second coil 362b includes a bottom layer coil (its reference numeral is omitted) and a top layer coil 364d.

Furthermore, the bottom layer coil 363a of the first coil 361a, the bottom layer coil 363c of the second coil 362a, the bottom layer coil 363b of the first coil 361b and the bottom layer coil of the second coil 362b are wound around and directly contacted with the assembling structure (not shown).

The top layer coil 364a of the first coil 361a is stacked on and wound around the bottom layer coil 363a of the first coil 361a, the top layer coil 364c of the second coil 362a is stacked on and wound around the bottom layer coil 363c of the second coil 362a, the top layer coil 364b of the first coil 361b is stacked on and wound around the bottom layer coil 363b of the first coil 361b, the top layer coil 364d of the second coil 362b is stacked on and wound around the bottom layer coil of the second coil 362b. Hence, the top layer coil 364a of the first coil 361a is farther away from the assembling structure than the bottom layer coil 363a of the first coil 361a away from the assembling structure, and the top layer coil 364a of the first coil 361a overlaps the bottom layer coil 363a of the first coil 361a along the direction parallel to an optical axis (its reference numeral is omitted); the top layer coil 364c of the second coil 362a is farther away from the assembling structure than the bottom layer coil 363c of the second coil 362a away from the assembling structure, and the top layer coil 364c of the second coil 362a overlaps the bottom layer coil 363c of the second coil 362a along the direction parallel to the optical axis; the top layer coil 364b of the first coil 361b is farther away from the assembling structure than the bottom layer coil 363b of the first coil 361b away from the assembling structure, and the top layer coil 364b of the first coil 361b overlaps the bottom layer coil 363b of the first coil 361b along the direction parallel to the optical axis; the top layer coil 364d of the second coil 362b is farther away from the assembling structure than the bottom layer coil of the second coil 362b away from the assembling structure, and the top layer coil 364d of the second coil 362b overlaps the bottom layer coil of the second coil 362b along the direction parallel to the optical axis.

Figure 3C:
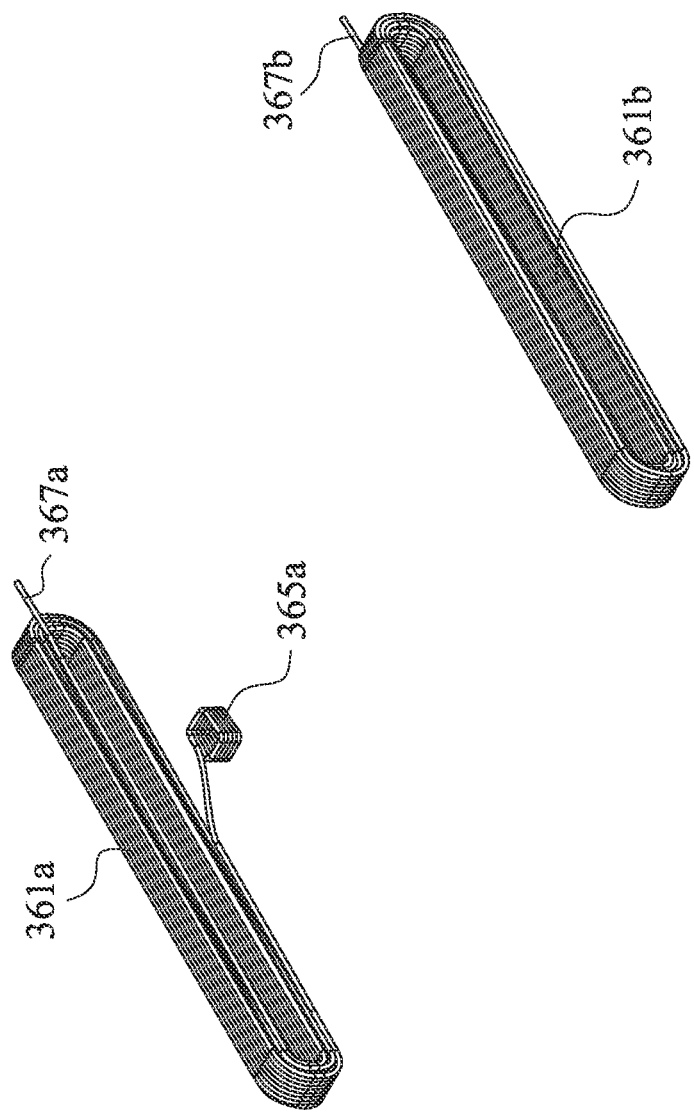
FIG. 3C is a schematic view of the first coils according to the 3rd example in FIG. 3A.
Figure 3D:
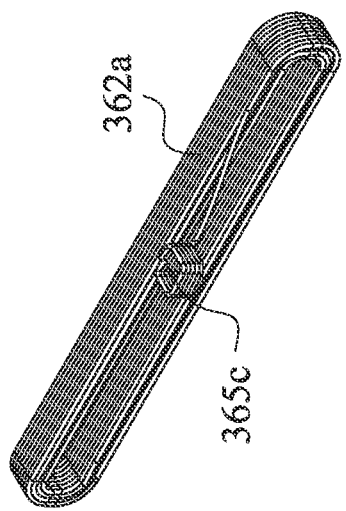
FIG. 3D is a schematic view of the second coils according to the 3rd example in FIG. 3A.
Figure 3D:
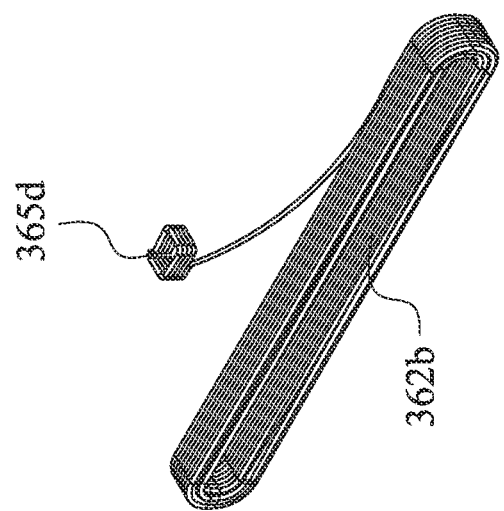
Figure 3E:
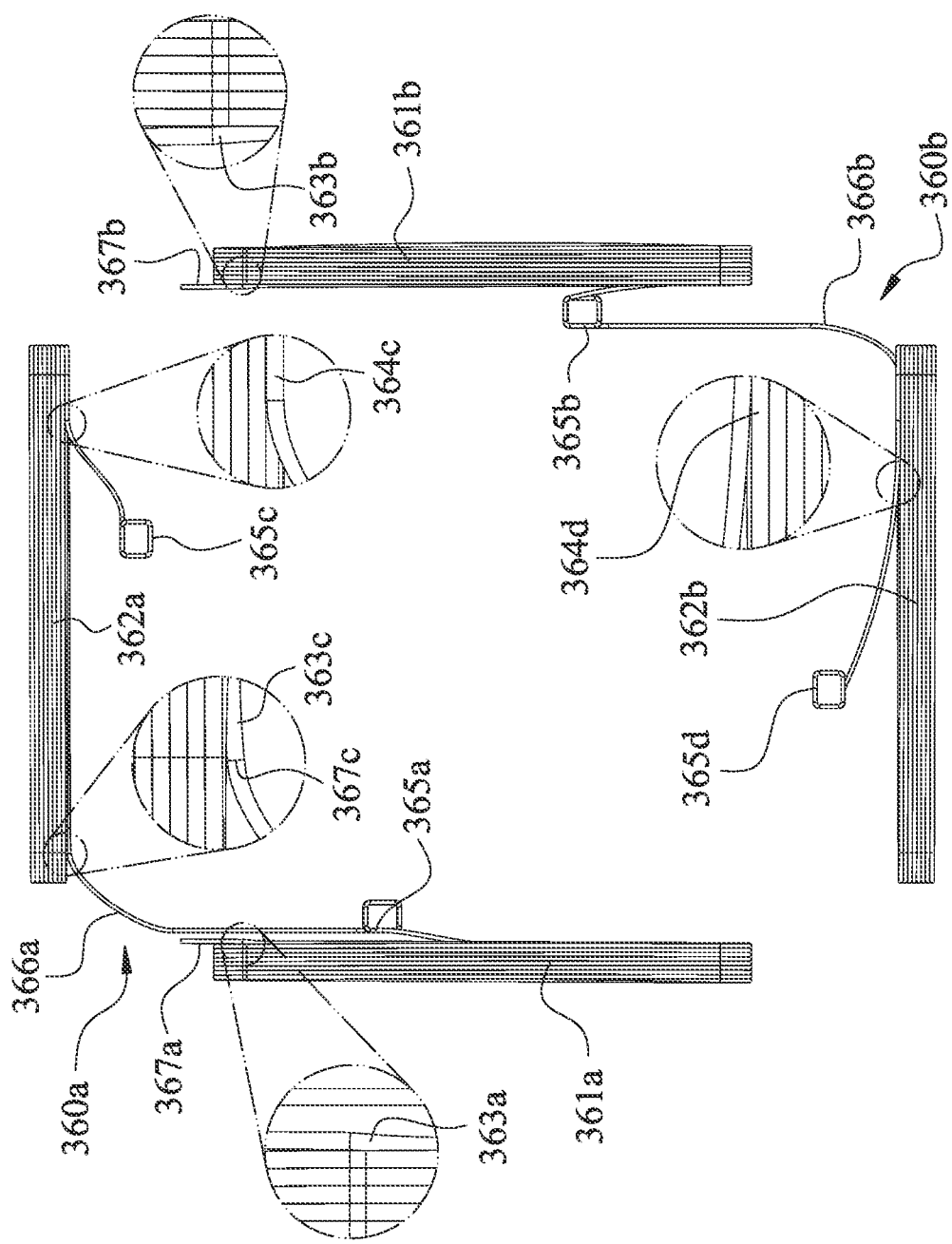
FIG. 3E is an object-side schematic view of the coil pairs according to the 3rd example in FIG. 3A.

FIG. 3C is a schematic view of the first coils 361a, 361b according to the 3rd example in FIG. 3A. FIG. 3D is a schematic view of the second coils 362a, 362b according to the 3rd example in FIG. 3A. In FIGS. 3A to 3D, the first coil 361a of the coil pair 360a and the first coil 361b of the coil pair 360b are simultaneously wound around, and then the second coil 362a of the coil pair 360a and the second coil 362b of the coil pair 360b are simultaneously wound around. Therefore, it is favorable for reducing the manufacturing process and lowering the cycle time of the product.

Figure 3F:
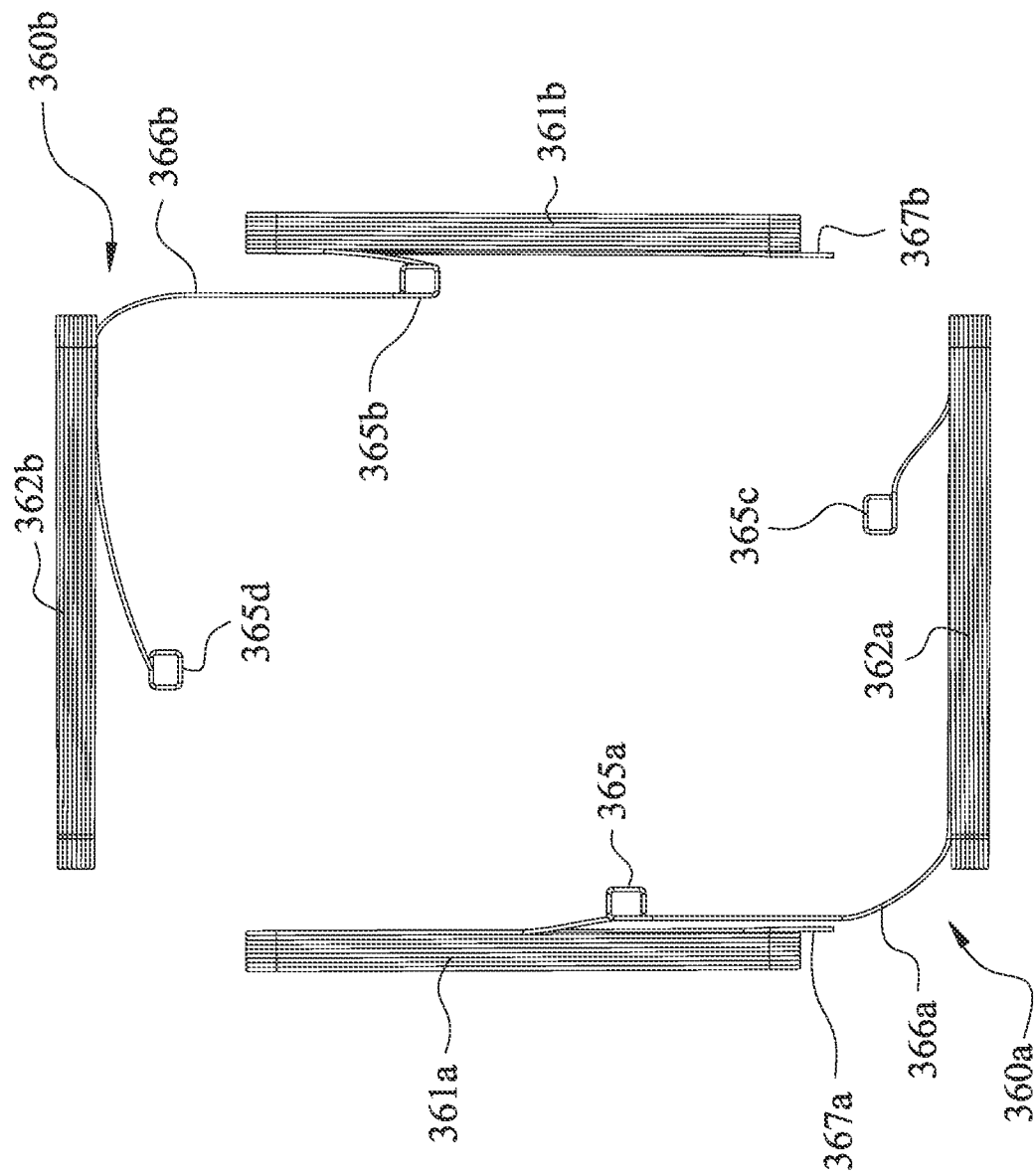
FIG. 3F is an image-side schematic view of the coil pairs according to the 3rd example in FIG. 3A.
Figure 3I:
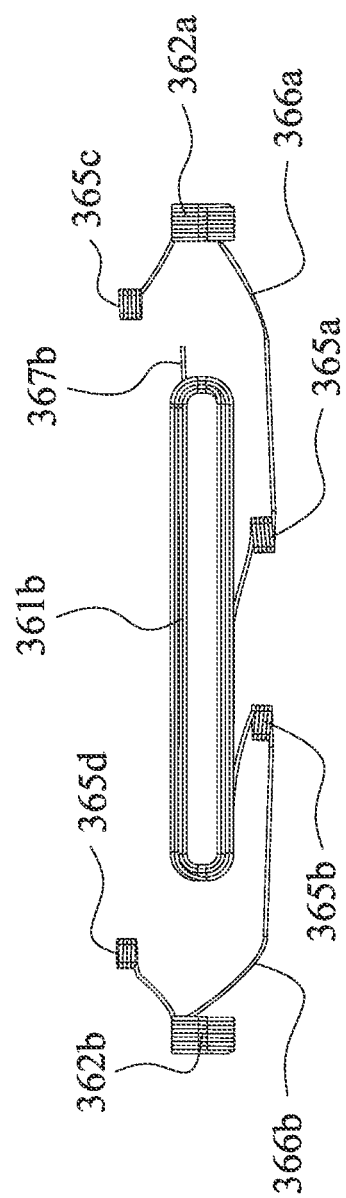
FIG. 3I is still another side schematic view of the coil pairs according to the 3rd example in FIG. 3A.

FIG. 3E is an object-side schematic view of the coil pairs 360a, 360b according to the 3rd example in FIG. 3A. FIG. 3F is an image-side schematic view of the coil pairs 360a, 360b according to the 3rd example in FIG. 3A. FIGS. 3G to 3I are side schematic views of the coil pairs 360a, 360b according to the 3rd example in FIG. 3A. In FIGS. 3A to 3I, the top layer coil has two wire terminals, and the bottom layer coil has two wire ends, wherein the coil pair can further include a connecting wire connected to the wire terminal of the top layer coil and the wire end of the bottom layer coil so as to keep the coil pair electrically connected. According to the 3rd example, the bottom layer coil 363a of the first coil 361a of the coil pair 360a has a wire end 367a, the top layer coil 364a of the first coil 361a has a wire terminal 365a, the bottom layer coil 363c of the second coil 362a of the coil pair 360a has a wire end 367c, and the top layer coil 364c of the second coil 362a has a wire terminal 365c, wherein the coil pair 360a can further include a connecting wire 366a connected to the wire terminal 365a of the top layer coil 364a of the first coil 361a and the wire end 367c of the bottom layer coil 363c of the second coil 362a so as to keep the coil pair 360a electrically connected; the bottom layer coil 363b of the first coil 361b of the coil pair 360b has a wire end 367b, the top layer coil 364b of the first coil 361b has a wire terminal 365b, the bottom layer coil of the second coil 362b of the coil pair 360b has a wire end (its reference numeral is omitted), and the top layer coil 364d of the second coil 362d has a wire terminal 365d, wherein the coil pair 360b can further include a connecting wire 366b connected to the wire terminal 365b of the top layer coil 364b of the first coil 361b and the wire end of the bottom layer coil of the second coil 362b so as to keep the coil pair 360b electrically connected. In particular, each of the connecting wires 366a, 366b can be a portion of each of the coil pairs 360a, 360b, but the present disclosure is not limited thereto. Therefore, the feasibility of each of the coil pairs 360a, 360b composed of the wire which is continuous can be provided.

Furthermore, the required tension of the wire for fixing the coil pair 360a is provided by the wire terminal 365a of the top layer coil 364a and the wire terminal 365c of the top layer coil 364c winding around the columnar structures (not shown) of the carrier element, and the required tension of the wire for fixing the coil pair 360b is provided by the wire terminal 365b of the top layer coil 364b and the wire terminal 365d of the top layer coil 364d winding around the columnar structures of the carrier element. Therefore, the wire can be prevented from loosing from the carrier element to promote the yield rate.

According to the 3rd example, the coil pair includes two coil pairs and four wire terminals, but the present disclosure is not limited thereto.

Further, all of other structures and dispositions according to the 3rd example are the same as the structures and the dispositions according to the 1st example and the 2nd example, and will not be described again herein.

4th Example

Figure 4A:
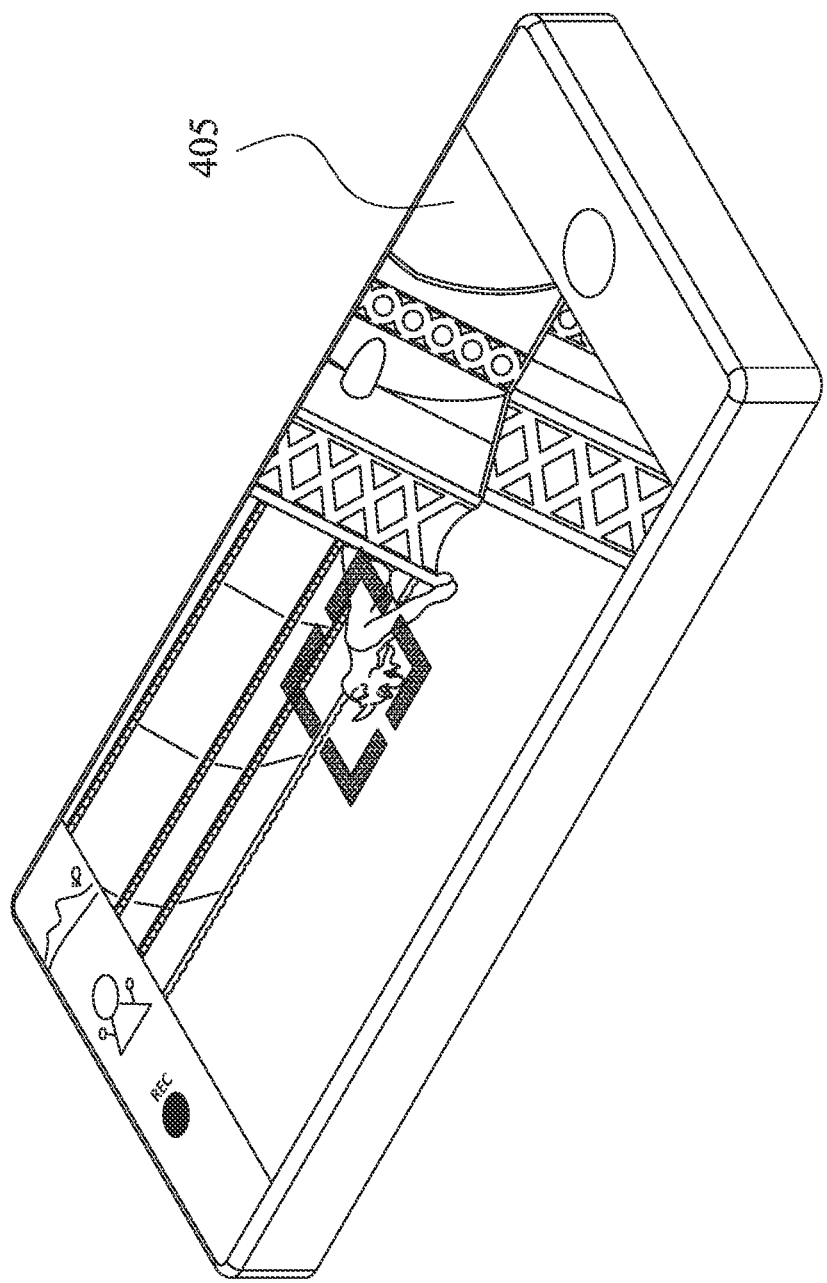
FIG. 4A is a schematic view of an electronic device according to the 4th example of the present disclosure.
Figure 4B:
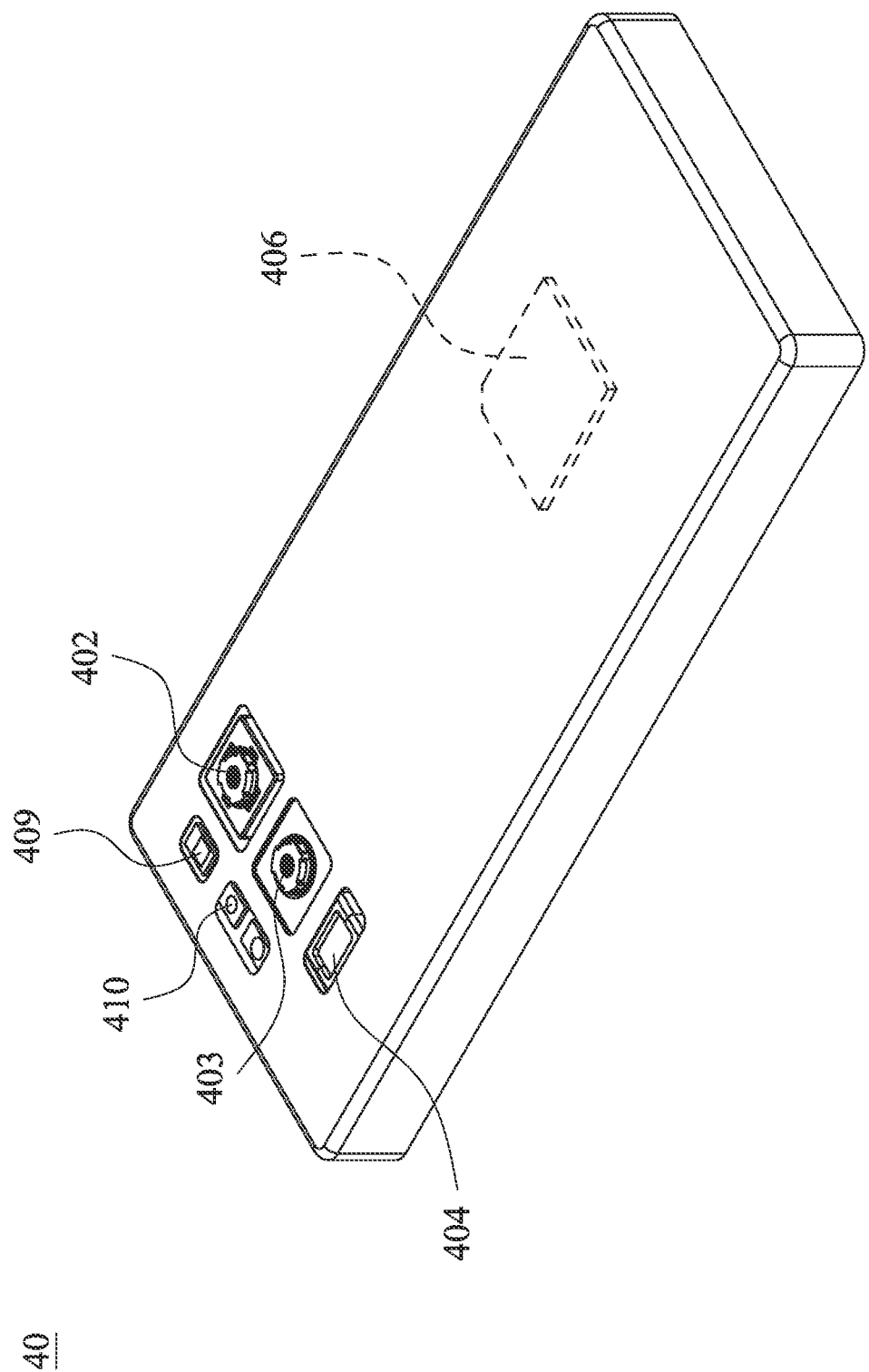
FIG. 4B is another schematic view of the electronic device according to the 4th example in FIG. 4A.
Figure 4C:
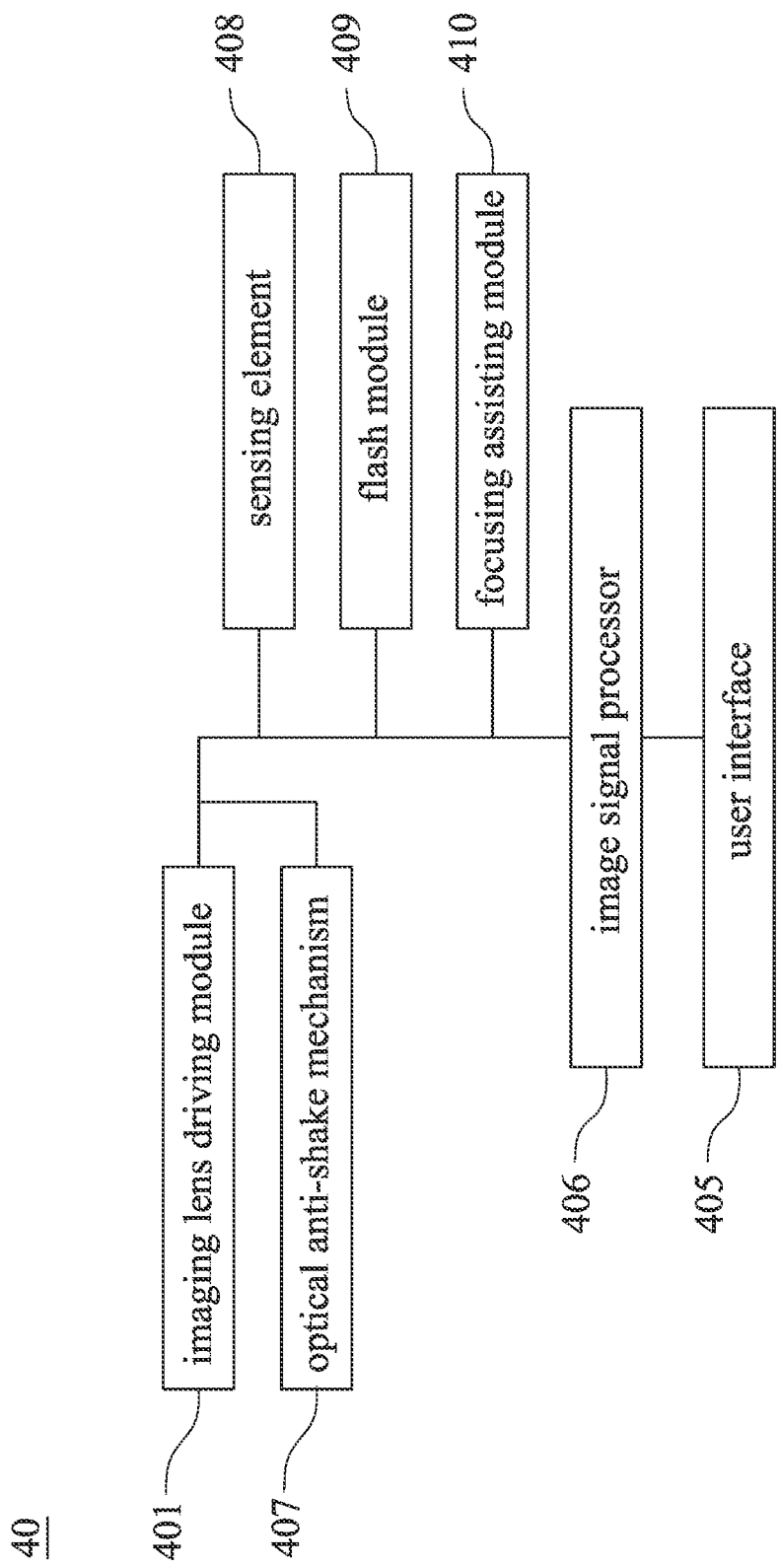
FIG. 4C is a block diagram of the electronic device according to the 4th example in FIG. 4A.

FIG. 4A is a schematic view of an electronic device 40 according to the 4th example of the present disclosure. FIG. 4B is another schematic view of the electronic device 40 according to the 4th example in FIG. 4A. In FIGS. 4A and 4B, the electronic device 40 is a smart phone, and includes an imaging lens driving module 401 (as shown in FIG. 4C), and the imaging lens driving module 401 includes a ultra-wide angle camera module 402, a high resolution camera module 403 and a telephoto camera module 404, wherein the imaging lens driving module 401 includes an imaging lens set (not shown), a carrier element (not shown) and a driving mechanism (not shown). Furthermore, the imaging lens driving module 401 can be one of the imaging lens driving modules according to the aforementioned 1st example to the 3rd example, but the present disclosure is not limited thereto. Therefore, it is favorable for satisfying the requirements of the mass production and the appearance of the imaging lens driving modules mounted on the electronic devices according to the current marketplace of the electronic device.

Moreover, users enter a shooting mode via the user interface 405 of the electronic device 40, wherein the user interface 405 according to the 4th example can be a touch screen for displaying the scene and have the touch function, and the shooting angle can be manually adjusted to switch the ultra-wide angle camera module 402, the high resolution camera module 403 and the telephoto camera module 404. At this moment, the imaging light is gathered on an image sensor (not shown) via the imaging lens set of the imaging lens driving module 401, and an electronic signal about an image is output to an image signal processor (ISP) 406.

FIG. 4C is a block diagram of the electronic device 40 according to the 4th example in FIG. 4A. In FIGS. 4B and 4C, to meet a specification of the electronic device 40, the electronic device 40 can further include an optical anti-shake mechanism 407. Furthermore, the electronic device 40 can further include at least one focusing assisting module 410 and at least one sensing element 408. The focusing assisting module 410 can be a flash module 409 for compensating a color temperature, an infrared distance measurement component, a laser focus module, etc. The sensing element 408 can have functions for sensing physical momentum and kinetic energy, such as an accelerator, a gyroscope, a Hall Effect Element, to sense shaking or jitters applied by hands of the user or external environments. Accordingly, the electronic device 40 equipped with an auto-focusing mechanism and the optical anti-shake mechanism 407 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. Furthermore, the users can visually see a captured image of the camera through the user interface 405 and manually operate the view finding range on the user interface 405 to achieve the autofocus function of what you see is what you get.

Moreover, the imaging lens driving module 401, the image sensor, the optical anti-shake mechanism 407, the sensing element 408 and the focusing assisting module 410 can be disposed on a flexible printed circuit board (FPC) (its reference numeral is omitted) and electrically connected to the associated components, such as the imaging signal processor 406, via a connector (not shown) to perform a capturing process. Since the current electronic devices, such as smart phones, have a tendency of being compact, the way of firstly disposing the imaging lens driving module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens driving module can also be controlled more flexibly via the touch screen of the electronic device. According to the 4th embodiment, the electronic device 40 includes a plurality of sensing elements 408 and a plurality of focusing assisting modules 410. The sensing elements 408 and the focusing assisting modules 410 are disposed on the flexible printed circuit board and at least one other flexible printed circuit board (not shown) and electrically connected to the associated components, such as the image signal processor 406, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 40 can further include, but not be limited to, a display, a control unit, a storage unit, a random access memory (RAM), a read-only memory (ROM), or the combination thereof.

Figure 4D:
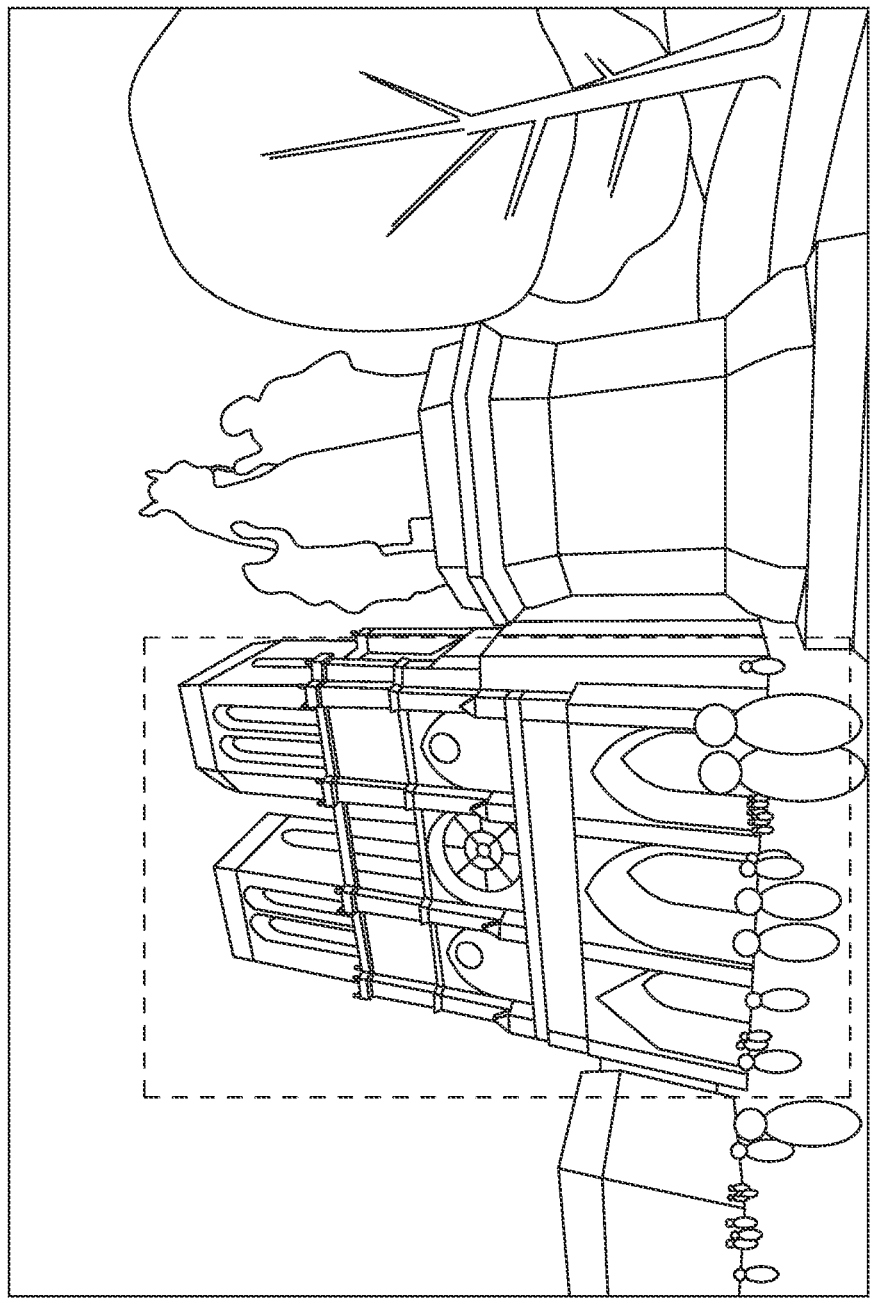
FIG. 4D is a schematic view of an image shot via the ultra-wide angle camera module according to the 4th example in FIG. 4A.

FIG. 4D is a schematic view of an image shot via the ultra-wide angle camera module 402 according to the 4th example in FIG. 4A. In FIG. 4D, the larger range of the image can be captured via the ultra-wide angle camera module 402, and the ultra-wide angle camera module 402 has the function of accommodating more wide range of the scene.

Figure 4E:
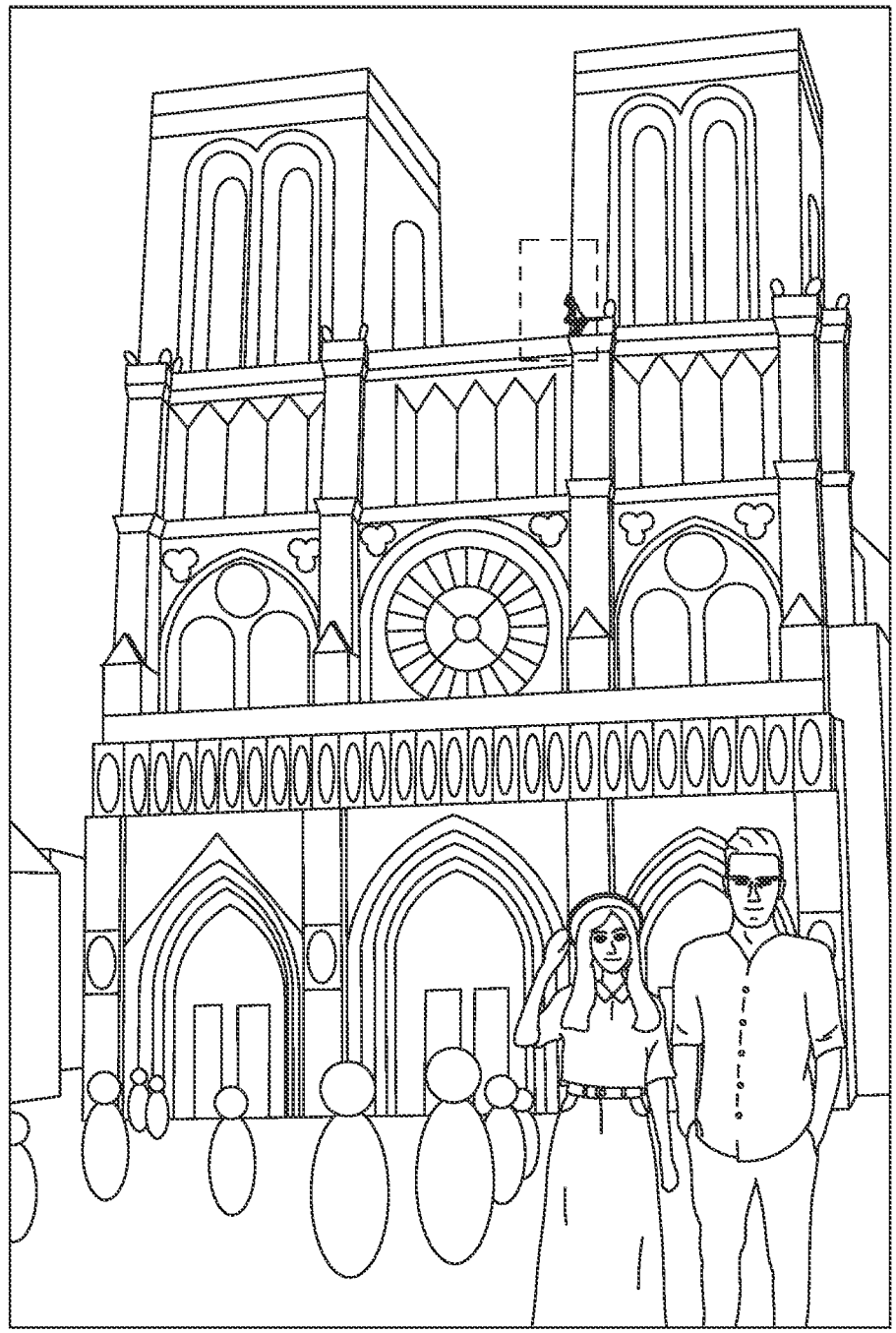
FIG. 4E is a schematic view of an image shot via the high resolution camera module according to the 4th example in FIG. 4A.

FIG. 4E is a schematic view of an image shot via the high resolution camera module 403 according to the 4th example in FIG. 4A. In FIG. 4E, the image of the certain range with the high resolution can be captured via the high resolution camera module 403, and the high resolution camera module 403 has the function of the high resolution and the low deformation.

Figure 4F:
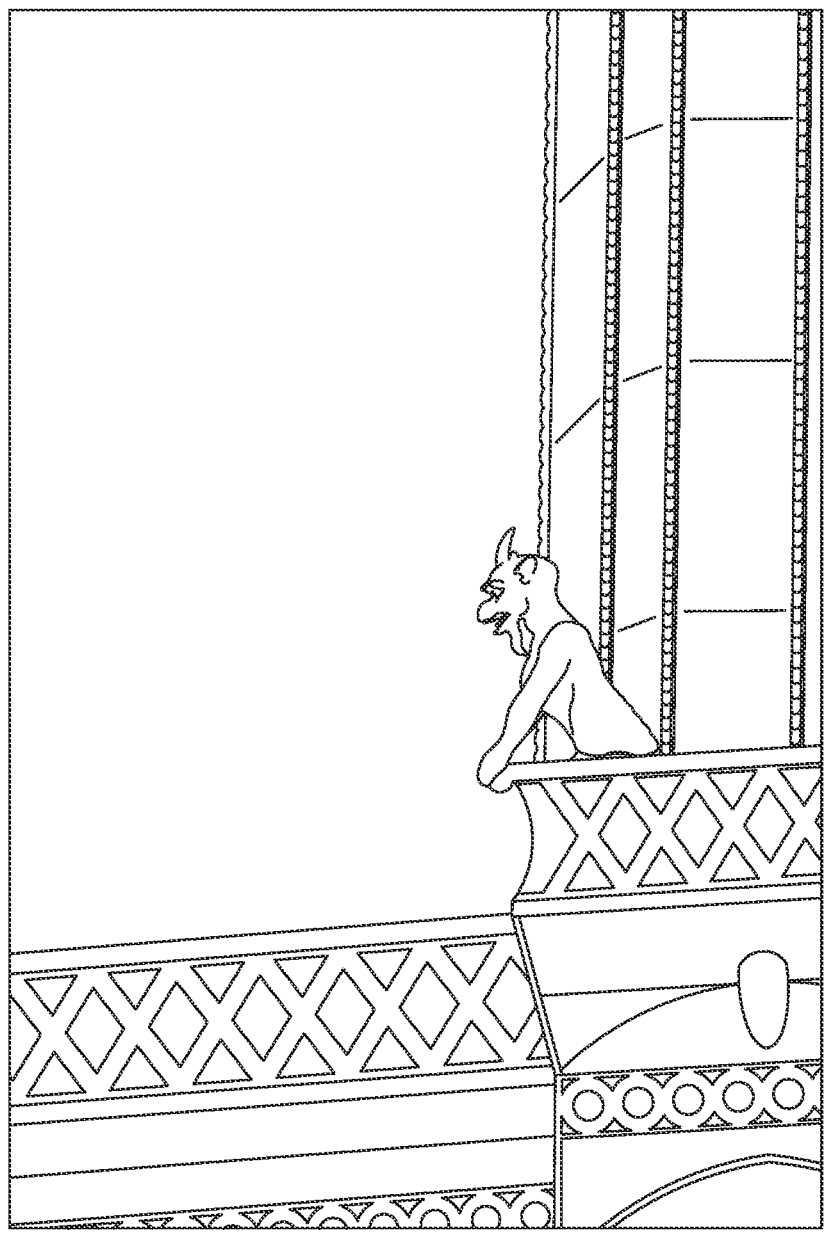
FIG. 4F is a schematic view of an image shot via the telephoto camera module according to the 4th example in FIG. 4A.

FIG. 4F is a schematic view of an image shot via the telephoto camera module 404 according to the 4th example in FIG. 4A. In FIG. 4F, the telephoto camera module 404 has the enlarging function of the high magnification, and the distant image can be captured and enlarged with high magnification via the telephoto camera module 404.

In FIGS. 4D to 4F, the zooming function can be obtained via the electronic device 40, when the scene is captured via the imaging lens driving module 401 with different focal lengths cooperated with the function of image processing.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens driving module, comprising:
   an imaging lens set having an optical axis;
   a carrier element configured to dispose the imaging lens set, and comprising:
      two pairs of assembling structures disposed on an outer surface of the carrier element, and extending along a direction away from the optical axis; and
      a driving mechanism configured to drive the carrier element to move along a direction parallel to the optical axis, and comprising:
         two coil pairs disposed on the two pairs of assembling structures of the carrier element, and comprising:
            a first coil pair disposed on one of the two pairs of assembling structures of the carrier element; and
            a second coil pair disposed on the other one of the two pairs of assembling structures of the carrier element, the second coil pair corresponding to the first coil pair, and each of the first coil pair and the second coil pair comprising:
               a bottom layer coil wound around and directly contacted with the two pairs of assembling structures; and
               a top layer coil stacked on and wound around the bottom layer coil, the top layer coil farther away from the two pairs of assembling structures than the bottom layer coil away from the two pairs of assembling structures, and the top layer coil overlapping the bottom layer coil along the direction parallel to the optical axis;
         at least two magnets corresponding to the two coil pair, respectively; and
         at least one elastic element coupled with the carrier element;
   wherein a coiling direction of the first coil pair and a coiling direction of the second coil pair are the same during observing from the first coil pair towards the second coil pair;
   wherein the at least one elastic element comprises a lower elastic element, and the lower elastic element comprises four elastic sheets electrically separated from each other;
   wherein each of the first coil pair and the second coil pair of the driving mechanism is a wire composed by simultaneously winding around each of the two pairs of assembling structures of the carrier element from the bottom layer coil towards two wire terminals of the top layer coil and formed symmetrically.

2. The imaging lens driving module of claim 1, wherein the first coil pair and the second coil pair are composed of two wires, so as to keep the first coil pair and the second coil pair electrically separated.

3. The imaging lens driving module of claim 2, wherein the lower elastic element disposed on an image side of the imaging lens set.

4. The imaging lens driving module of claim 1, wherein the elastic sheets are electrically connected to a wire terminal of the first coil pair and a wire end of the first coil pair and a wire terminal of the second coil pair and a wire end of the second coil pair, respectively.

5. An electronic device, comprising:
   the imaging lens driving module of claim 1.

* * * * *